US012759255B2

(12) United States Patent
Miyabe

(10) Patent No.: US 12,759,255 B2
(45) Date of Patent: Oct. 13, 2026

(54) MULTILAYERED CONTAINER AND METHOD FOR PRODUCING SAME

(71) Applicant: Mitsubishi Gas Chemical Company, Inc., Tokyo (JP)

(72) Inventor: Takanori Miyabe, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 349 days.

(21) Appl. No.: 18/209,059

(22) Filed: Jun. 13, 2023

(65) Prior Publication Data

US 2023/0321943 A1 Oct. 12, 2023

Related U.S. Application Data

(63) Continuation of application No. 17/417,691, filed as application No. PCT/JP2019/049842 on Dec. 19, 2019, now abandoned.

(51) Int. Cl.

| | |
|---|---|
| ***B32B 1/02*** | (2006.01) |
| ***B29C 49/06*** | (2006.01) |
| ***B29C 49/12*** | (2006.01) |
| ***B29C 49/78*** | (2006.01) |
| ***B32B 1/00*** | (2006.01) |
| ***B32B 27/08*** | (2006.01) |
| ***B32B 27/34*** | (2006.01) |
| ***B32B 27/36*** | (2006.01) |
| ***B65D 1/02*** | (2006.01) |
| ***C08G 63/12*** | (2006.01) |
| ***C08G 63/183*** | (2006.01) |
| ***C08G 69/26*** | (2006.01) |
| *B29K 67/00* | (2006.01) |
| *B29K 77/00* | (2006.01) |
| *B29L 31/00* | (2006.01) |

(52) U.S. Cl.

CPC ................ *B32B 1/00* (2013.01); *B29C 49/06* (2013.01); *B29C 49/12* (2013.01); *B29C 49/78* (2013.01); *B32B 27/08* (2013.01); *B32B 27/34* (2013.01); *B32B 27/36* (2013.01); *B65D 1/0215* (2013.01); *C08G 63/12* (2013.01); *C08G 63/183* (2013.01); *C08G 69/26* (2013.01); *B29C 2949/3032* (2022.05); *B29K 2067/00* (2013.01); *B29K 2077/00* (2013.01); *B29L 2031/7158* (2013.01); *B32B 2439/60* (2013.01)

(58) Field of Classification Search

CPC ......... B32B 27/36; B32B 27/08; B32B 27/18; B32B 27/34; B32B 1/00; B32B 7/12; B32B 2250/03; B32B 2439/80; B32B 2439/60; B32B 2439/70; B32B 2250/24; B32B 2307/732; B32B 2307/7244; B32B 2307/748; B65D 1/0215; B29C 49/12; B29C 49/06; B29C 49/78; B29C 49/087; B29C 2949/3032; B29C 2949/0715; B29C 2049/7879; B29C 2049/023; B29C 2049/7834; B29C 2049/7832; B29C 49/783; C08G 69/26; C08G 63/12; C08G 63/183; B29L 2031/7158; B29K 2067/00; B29K 2077/00

See application file for complete search history.

(56) References Cited

U.S. PATENT DOCUMENTS

| | | | | |
|---|---|---|---|---|
| 4,182,457 | A | 1/1980 | Yamada et al. | |
| 4,511,610 | A | 4/1985 | Yazaki et al. | |
| 4,564,541 | A | 1/1986 | Taira et al. | |
| 4,734,303 | A | 3/1988 | Fujiwara et al. | |
| 4,816,304 | A | 3/1989 | Nohara et al. | |
| 7,811,646 | B2 | 10/2010 | Ikeda et al. | |
| 8,822,001 | B2 | 9/2014 | Akkapeddi et al. | |
| 2002/0098310 | A1 | 7/2002 | Kikuchi et al. | |
| 2002/0146527 | A1 * | 10/2002 | Kikuchi | B32B 27/08 428/35.7 |

(Continued)

FOREIGN PATENT DOCUMENTS

| | | | |
|---|---|---|---|
| EP | 1974901 | A1 | 10/2008 |
| EP | 1977878 | A1 | 10/2008 |

(Continued)

OTHER PUBLICATIONS

JPO; Application No. 2020-563168; Office Action dated Jul. 18, 2023 and English translation submitted herewith, 6 pages.

(Continued)

*Primary Examiner* — Thomas M Wittenschlaeger

(74) *Attorney, Agent, or Firm* — Fitch, Even, Tabin & Flannery LLP

(57) ABSTRACT

A multilayer container having a polyester layer comprising a thermoplastic polyester resin (X) and a polyamide layer comprising a polyamide resin (Y), wherein the polyester layer is an innermost layer and the polyamide layer is an interlayer, and the polyamide resin (Y) comprises a polyamide resin (Y-1) comprising a structural unit derived from a diamine and a structural unit derived from a dicarboxylic acid, 70 mol % or more of the structural unit derived from a diamine being a structural unit derived from xylylenediamine; and 70 mol % or more of the structural unit derived from a dicarboxylic acid being a structural unit derived from an α,ω-linear aliphatic dicarboxylic acid having 4 to 20 carbon atoms, and wherein a stretching ratio in a transverse direction (TD) is 2.2 times or more, and a stretching ratio in a machine direction (MD) to the stretching ratio in the transverse direction (TD) (MD/TD) is 0.6 or more and less than 1.0.

17 Claims, No Drawings

(56) References Cited

U.S. PATENT DOCUMENTS

| | | | | |
|---|---|---|---|---|
| 2004/0091653 | A1 | 5/2004 | Tai et al. | |
| 2007/0224375 | A1* | 9/2007 | Sato | B29C 49/0006 264/519 |
| 2009/0120900 | A1* | 5/2009 | Mitadera | B65D 1/0215 215/382 |
| 2009/0277858 | A1* | 11/2009 | Mitadera | B65D 1/0215 215/12.1 |
| 2010/0233401 | A1* | 9/2010 | Mitadera | B65D 1/0215 525/420 |
| 2014/0127433 | A1* | 5/2014 | Arakawa | B32B 7/12 428/474.4 |
| 2014/0220274 | A1* | 8/2014 | Oda | C08L 77/06 428/36.6 |
| 2015/0298887 | A1* | 10/2015 | Okada | B32B 27/36 428/36.6 |
| 2016/0176170 | A1* | 6/2016 | Sato | B32B 27/34 264/513 |
| 2017/0183426 | A1* | 6/2017 | Kawai | B32B 27/304 |
| 2018/0296437 | A1* | 10/2018 | Arakawa | G01N 1/10 |

FOREIGN PATENT DOCUMENTS

| | | | |
|---|---|---|---|
| EP | 2724859 | A1 | 4/2014 |
| EP | 3357690 | A1 | 8/2018 |
| JP | S60-232952 | A | 11/1985 |
| JP | 2003-191319 | A | 7/2003 |
| JP | 2006-111718 | A | 4/2006 |
| JP | 2015-142986 | A | 8/2015 |
| JP | 2016-169027 | A | 9/2016 |
| JP | 2018-122920 | A | 8/2018 |
| WO | 2003/080731 | A2 | 10/2003 |
| WO | 2005/012430 | A1 | 2/2005 |
| WO | 2017/057463 | A1 | 4/2017 |
| WO | 2017/141969 | A1 | 8/2017 |

OTHER PUBLICATIONS

International Search Report for PCT/JP2019/049842, mailed Mar. 3, 2020, and English Translation submitted herewith (5 pages).

* cited by examiner

MULTILAYERED CONTAINER AND METHOD FOR PRODUCING SAME

CROSS-REFERENCE TO RELATED APPLICATIONS

This application is a continuation of application Ser. No. 17/417,691, filed Jun. 23, 2021, which is a U.S. National Phase Application filed under 35 U.S.C. § 371 of International Application PCT/JP2019/049842, filed Dec. 19, 2019, designating the United States, which claims priority from Japanese Application Number 2018-248402, filed Dec. 28, 2018.

FIELD OF THE INVENTION

The present invention relates to a multilayer container and a method for producing the same.

BACKGROUND OF THE INVENTION

Polyester resins, which are typically polyethylene terephthalate (PET), have characteristics such as excellent transparency, mechanical property, melt stability and recyclability, and thus at present are widely used as various packaging materials including film, sheet and hollow containers. Meanwhile, when a polyester resin is used for bottles, hollow containers composed only of the polyester resin do not always have a sufficient gas barrier property for gas such as carbon dioxide gas and oxygen.

Thus, researchers have considered multilayer bodies and multilayer containers using a polyester resin as a resin constituting an outer layer and an inner layer and having a barrier layer made of a polyamide resin as an interlayer between the outer layer and the inner layer (PTLs 1 to 3).

CITATION LIST

Patent Literature

PTL 1: JP 2016-169027
PTL 2: JP1985-232952
PTL 3: JP 2006-111718

SUMMARY OF INVENTION

When a polyamide resin composed of metaxylylenediamine and adipic acid is used as a polyamide resin, a multilayer container having an excellent oxygen barrier property can be obtained. However, delamination between the inner layer and the outer layer composed of a polyester resin and the barrier layer (interlayer) has been found to occur in some cases due to, for example, impact from the outside.

An object of the present invention is to solve the above problem and provide a multilayer container having an excellent oxygen barrier property and excellent delamination resistance and a method for producing the same.

In view of the aforementioned problem, the present inventors made extensive and intensive investigations. As a result, it has been found that the aforementioned problem can be solved by setting the stretching ratio in a multilayer container comprising a polyamide layer comprising a specific polyamide resin and a polyester layer to a specific range, and the present invention have been completed.

Accordingly, the present invention relates to the following multilayer container and method for producing the same.

<1> A multilayer container comprising a polyester layer comprising a thermoplastic polyester resin (X) and a polyamide layer comprising a polyamide resin (Y), wherein the polyester layer is an innermost layer and the polyamide layer is an interlayer, and the polyamide resin (Y) comprises a polyamide resin (Y-1) comprising a structural unit derived from a diamine and a structural unit derived from a dicarboxylic acid, 70 mol % or more of the structural unit derived from a diamine being a structural unit derived from xylylenediamine; and 70 mol % or more of the structural unit derived from a dicarboxylic acid being a structural unit derived from an α,ω-linear aliphatic dicarboxylic acid having 4 to 20 carbon atoms, and wherein a stretching ratio in a transverse direction (TD) is 2.2 times or more, and a stretching ratio in a machine direction (MD) to the stretching ratio in the transverse direction (TD) (MD/TD) is 0.6 or more and less than 1.0.

<2> The multilayer container as set forth in the above <1>, wherein the multilayer container has a capacity of 200 to 600 mL.

<3 The multilayer container as set forth in the above <1>, wherein the multilayer container has a capacity of 200 to 350 mL.

<4> The multilayer container as set forth in any one of the above <1> to <3>, wherein the multilayer container has a total thickness of 50 to 500 μm.

<5> The multilayer container as set forth in any one of the above <1> to <4>, wherein the multilayer container comprises at least one polyester layer on the inside and the outside, respectively, of the polyamide layer.

<6> The multilayer container as set forth in any one of the above <1> to <5>, wherein the multilayer container has a three-layer structure of a polyester layer as an innermost layer and an outermost layer and a polyamide layer as an interlayer.

<7> The multilayer container as set forth in any one of the above <1> to <6>, wherein the thermoplastic polyester resin (X) comprises a thermoplastic polyester resin (X-1) comprising a structural unit derived from a dicarboxylic acid and a structural unit derived from a diol, 50 mol % or more of the structural unit derived from a dicarboxylic acid being a structural unit derived from terephthalic acid; and 50 mol % or more of the structural unit derived from a diol being a structural unit derived from ethylene glycol.

<8> The multilayer container as set forth in the above <7>, wherein the thermoplastic polyester resin (X-1) comprises a structural unit derived from a dicarboxylic acid and a structural unit derived from a diol, 90 mol % or more of the structural unit derived from a dicarboxylic acid being a structural unit derived from terephthalic acid; and 90 mol % or more of the structural unit derived from a diol being a structural unit derived from ethylene glycol.

<9> The multilayer container as set forth in any one of the above <1> to <8>, wherein the polyamide resin (Y-1) comprises a structural unit derived from a diamine and a structural unit derived from a dicarboxylic acid, 80 mol % or more of the structural unit derived from a diamine being a structural unit derived from xylylenediamine; and 80 mol % or more of the structural unit derived from a dicarboxylic acid being a structural unit derived from adipic acid.

<10> A method for producing a multilayer container, comprising the following Steps 1 and 2:

Step 1: a step for injection molding a multilayer preform comprising a polyester layer comprising a thermoplastic polyester resin (X) and a polyamide layer comprising a polyamide resin (Y), wherein the polyester layer is an innermost layer and the polyamide layer is an interlayer, and the polyamide resin (Y) comprises a polyamide resin (Y-1) comprising a structural unit derived from a diamine and a structural unit derived from a dicarboxylic acid, 70 mol % or more of the structural unit derived from a diamine being a structural unit derived from xylylenediamine; and 70 mol % or more of the structural unit derived from a dicarboxylic acid being a structural unit derived from an α,ω-linear aliphatic dicarboxylic acid having 4 to 20 carbon atoms;

Step 2: a step for biaxially stretch blow molding the multilayer preform obtained in the Step 1 by a process satisfying the following conditions (1) to (5):

(1) heating the surface of the multilayer preform at 80 to 120° C.; then (2) blowing high pressure air while changing the pressure in multiple stages with stretching the multilayer preform in a mold in a machine direction using a rod;

(3) a pressure in a first stage at the time of blowing high pressure air in multiple stages (primary blow pressure) of 0.3 to 2.0 MPa;

(4) a delay time in primary blow of 0.1 to 0.5 seconds;

(5) a stretching ratio in a transverse direction (TD) of 2.2 times or more, and a stretching ratio in a machine direction (MD) to the stretching ratio in the transverse direction (TD) (MD/TD) of 0.6 or more and less than 1.0.

<11> The method for producing a multilayer container as set forth in the above <10>, wherein the polyamide layer of the multilayer preform has a moisture content of 0.005 to 1% by mass.

The present invention can provide a multilayer container having an improved oxygen barrier property and excellent delamination resistance and a method for producing the same.

DESCRIPTION OF EMBODIMENTS

The present invention will hereunder be described by reference to embodiments. In the following description, the expression "A to B" means "A or more and B or less" (when A<B), or "A or less and B or more" (when A>B). In other words, "A to B" indicates a numerical range including the end points A and B.

Furthermore, parts by mass and % by mass have the same meaning as parts by weight and % by weight, respectively.

[Multilayer Container]

The multilayer container of the present invention comprises a polyester layer comprising a thermoplastic polyester resin (X) and a polyamide layer comprising a polyamide resin (Y), wherein the polyester layer is an innermost layer and the polyamide layer is an interlayer, and the polyamide resin (Y) comprises a polyamide resin (Y-1) comprising a structural unit derived from a diamine and a structural unit derived from a dicarboxylic acid, 70 mol % or more of the structural unit derived from a diamine being a structural unit derived from xylylenediamine; and 70 mol % or more of the structural unit derived from a dicarboxylic acid being a structural unit derived from an α,ω-linear aliphatic dicarboxylic acid having 4 to 20 carbon atoms, and wherein a stretching ratio in a transverse direction (TD) is 2.2 times or more, and a stretching ratio in a machine direction (MD) to the stretching ratio in the transverse direction (TD) (MD/TD) is 0.6 or more and less than 1.0.

The present inventors have found that a multilayer container having an excellent oxygen barrier property and excellent delamination resistance can be obtained when the stretching ratio in the transverse direction (TD) is 2.2 times or more, and the stretching ratio in the machine direction (MD) to the stretching ratio in the transverse direction (TD) (MD/TD) is 0.6 or more and less than 1.0 in a multilayer container comprising a polyester layer comprising a thermoplastic polyester resin (X) and a polyamide layer comprising a polyamide resin (Y), wherein the polyester layer is an innermost layer and the polyamide layer is an interlayer, and the polyamide resin (Y) comprises a specific polyamide resin (Y-1), and have completed the present invention. Although the reason why the above effect is obtained is not clear, the reason may be that revealing sufficient effect for stretching and orientation increases residual stress in the respective layers and this suppresses points where delamination occurs.

Hereinafter the present invention will be described in detail.

<Polyester Layer>

The multilayer container of the present invention comprises a polyester layer comprising a thermoplastic polyester resin (X). The polyester layer constitutes at least the innermost layer of the multilayer container. It is preferred that the innermost polyester layer is disposed so that it is in direct contact with the polyamide layer.

(Thermoplastic Polyester Resin (X))

The thermoplastic polyester resin (X), which the polyester layer comprises (hereinafter also simply referred to as the polyester resin (X)), will be described below. In the present invention, of polyester resins, a polyester resin which shows thermoplastic property is used as the polyester resin (X). Some unsaturated polyesters show thermosetting property.

The thermoplastic polyester resin (X) is preferably a polycondensation polymer of a dicarboxylic acid and a diol. Examples of the structural unit derived from a dicarboxylic acid (dicarboxylic acid units) preferably include a structural unit derived from an aromatic dicarboxylic acid and examples of the structural unit derived from a diol (diol units) preferably include a structural unit derived from an aliphatic diol. An ester of a dicarboxylic acid may also be used as a dicarboxylic acid in addition to a dicarboxylic acid. Specific examples thereof preferably include an alkyl ester of a dicarboxylic acid having 1 to 4 carbon atoms.

Examples of the aromatic dicarboxylic acid include terephthalic acid, isophthalic acid, orthophthalic acid, biphenyldicarboxylic acid, diphenyl ether dicarboxylic acid, diphenylsulfone dicarboxylic acid, diphenylketone dicarboxylic acid, 2,6-naphthalenedicarboxylic acid, 1,4-naphthalenedicarboxylic acid and 2,7-naphthalenedicarboxylic acid. Terephthalic acid, isophthalic acid, orthophthalic acid, naphthalenedicarboxylic acid and 4,4'-biphenyldicarboxylic acid are preferred, isophthalic acid and terephthalic acid are more preferred, and terephthalic acid is further preferred. An alkyl ester of an aromatic dicarboxylic acid having 1 to 4 carbon atoms may also be used as an aromatic dicarboxylic acid as described above.

Examples of the aromatic dicarboxylic acid also include a sulfophthalic acid and a sulfophthalic acid metal salt. Sulfophthalic acid and a sulfophthalic acid metal salt are represented by the following formula (I) or (I'), respectively.

(I)

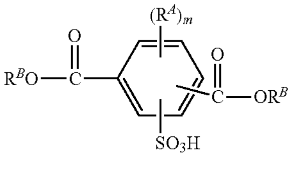

-continued (I')

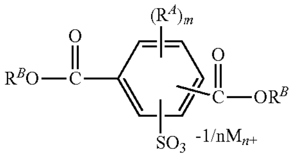

In the above formula (I'), M is a metal atom. n represents the valence of M.

Examples of the metal atom M include an alkali metal such as lithium, sodium and potassium and an alkaline earth metal such as beryllium, magnesium, calcium and strontium. Of them, alkali metals are preferred, sodium or lithium is preferred, and sodium is more preferred. When n is 2 or more, the unit may be cross-linked to another unit (e.g., another sulfophthalic acid unit or a sulfo group in a sulfophthalic acid metal salt unit) through M.

In the above formulas (I) and (I'), $R^A$ is a substituted or unsubstituted alkyl group or a substituted or unsubstituted aryl group. m represents an integer of 0 to 3. When m is 2 or 3, each $R^A$ may be the same or different.

Examples of the above alkyl group include a methyl group, an ethyl group, a n-propyl group, an isopropyl group, a n-butyl group, a t-butyl group, a n-octyl group, and a 2-ethylhexyl group. Of them, an alkyl group having 1 to 6 carbon atoms is preferred, and an alkyl group having 1 to 4 carbon atoms is more preferred.

Examples of the above aryl group include a phenyl group and a naphthyl group. Of them, an aryl group having 6 to 12 carbon atoms is preferred, and a phenyl group is more preferred.

Examples of substituents which the above alkyl group or aryl group may have include a halogen atom such as a chlorine atom, a bromine atom and an iodine atom, an alkyl group, an alkenyl group, an aryl group, a cyano group, a hydroxyl group, a nitro group, an alkoxy group, an aryloxy group, an acyl group, an amino group, a mercapto group, an alkylthio group and an arylthiol group. Of these groups, a group having a hydrogen atom may be further substituted by the above substituent.

Specific examples of $R^A$ include a methyl group, an ethyl group, a n-propyl group, an isopropyl group, a n-butyl group, a t-butyl group, a 1-methylpropyl group, a 2-methylpropyl group, a hydroxymethyl group, a 1-hydroxyethyl group, a mercaptomethyl group, a methylthioethyl group, a phenyl group, a naphthyl group, a biphenyl group, a benzyl group and a 4-hydroxybenzyl group. Of them, a methyl group, an ethyl group and a benzyl group are preferred.

In the above formulas (I) and (I'), $R^B$ represents a hydrogen atom or an alkyl group having 1 to 4 carbon atoms.

While preferred $R^A$ is as described above, a unit in which m=0, i.e., a unit whose benzene ring is not substituted by $R^A$, which is represented by the following formula (Ia) or (I'a), respectively, is preferred as the sulfophthalic acid or the sulfophthalic acid metal salt used for the polyester resin (X).

(Ia)

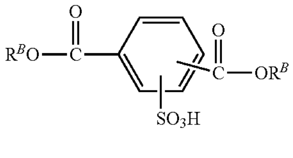

-continued (I'a)

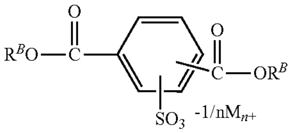

In the above formula (Ia), $R^B$ is the same as $R^B$ in the formula (I).

Furthermore, in the above formula (I'a), $R^B$, M and n are the same as $R^B$, M and n in the formula (I').

In addition, examples of the sulfophthalic acid represented by the formula (Ia) or sulfophthalic acid metal salt represented by the formula (I'a) include a phthalic acid structure in which two —CO— moieties are bonded at the ortho-position, an isophthalic acid structure in which two —CO— moieties are bonded at the meta-position and a terephthalic acid structure in which two —CO— moieties are bonded at the para-position. Of them, an isophthalic acid structure is preferred. In other words, at least one of the sulfoisophthalic acids represented by the following formula (Ib) and sulfoisophthalic acid metal salts represented by the following formula (I'b) is preferred.

(Ib)

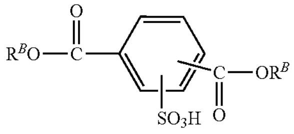

(I'b)

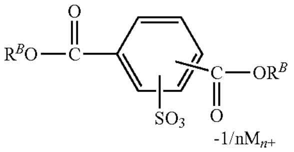

In the above formula (Ib), $R^B$ is the same as $R^B$ in the formula (I).

In the above formula (I'b), $R^B$, M and n are the same as $R^B$, M and n in the formula (I).

The position of the sulfo group in the sulfoisophthalic acid and sulfoisophthalic acid metal salt may be 2, 4, 5, 6-position, and those in which a group is substituted by the sulfo group at the 5-position, which is represented by the following formula (Ic) or (I'c), is preferred.

(Ic)

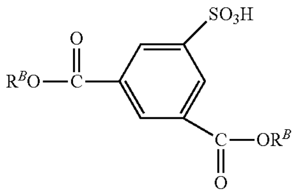

-continued (I'c)

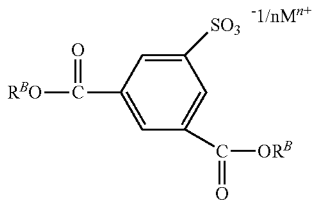

In the above formula (I'c), M and n are the same as M and n in the formula (I').

Examples of the sulfoisophthalic acid or sulfoisophthalic acid metal salts represented by the formula (Ic) or (I'c) in the polyester resin (X) include 5-sulfoisophthalic acid, sodium 5-sulfoisophthalate, lithium 5-sulfoisophthalate, potassium 5-sulfoisophthalate, calcium bis(5-sulfoisophthalate), sodium dimethyl 5-sulfoisophthalate and sodium diethyl 5-sulfoisophthalate.

In the case where the polyester resin (X) contains a structural unit derived from at least one selected from the group consisting of sulfophthalic acid and a sulfophthalic acid metal salt, it is preferred that the resin contains a structural unit derived from at least a sulfophthalic acid metal salt. The content of the structural unit derived from a sulfophthalic acid and a sulfophthalic acid metal salt in the polyester resin is preferably 0.01 to 15 mol %, more preferably 0.03 to 10.0 mol %, further preferably 0.06 to 5.0 mol %, and still more preferably 0.08 to 2.0 mol % based on all of the structural units derived from a dicarboxylic acid. The content of the structural unit derived from a sulfophthalic acid and a sulfophthalic acid metal salt in the polyester resin is preferably 0.08 mol % or less, more preferably 0.06 mol % or less, and further preferably 0.03 mol % or less based on all of the structural units derived from a dicarboxylic acid from the viewpoint of heat resistance to hot water and prevention of coloration in molding. In that case, the lower limit value may be 0 mol %.

Examples of the aliphatic diol include aliphatic diols having a linear or branched structure, such as ethylene glycol, 2-butene-1,4-diol, trimethylene glycol, tetramethylene glycol, hexamethylene glycol, neopentyl glycol, methylpentanediol, diethylene glycol, etc.; and alicyclic diols, such as cyclohexanedimethanol, isosorbide, spiro glycol, 2,2,4,4-tetramethyl-1,3-cyclobutanediol, norbornene dimethanol, tricyclodecane dimethanol, etc. Among these, ethylene glycol, neopentyl glycol, and cyclohexanedimethanol are preferred, with ethylene glycol being more preferred.

It is also preferred that the polyester resin contains, as the structural unit derived from a diol, a structural unit derived from an alicyclic diol. The alicyclic diol is preferably at least one alicyclic diol selected from the group consisting of cyclohexanedimethanol, isosorbide, spiro glycol, and 2,2,4,4-tetramethyl-1,3-cyclobutanediol. In the case where the polyester resin contains the aforementioned structural unit derived from an alicyclic diol, its content is preferably 1 to 50 mol %, more preferably 2 to 40 mol %, still more preferably 3 to 30 mol %, and yet still more preferably 5 to 25 mol % of the entire structural unit derived from a diol.

It is preferred that the thermoplastic polyester resin (X) used in the present invention comprises a thermoplastic polyester resin in which 50 mol % or more of the structural unit derived from a dicarboxylic acid (dicarboxylic acid unit) is a structural unit derived from an aromatic dicarboxylic acid and 50% or more of the structural unit derived from a diol (diol unit) is derived from aliphatic diol. It is more preferred that the thermoplastic polyester resin (X) comprises a thermoplastic polyester resin (X-1) in which 50 mol % or more of the dicarboxylic acid unit is a structural unit derived from terephthalic acid and 50 mol % or more of the diol unit is a structural unit derived from ethylene glycol.

It is more preferred that in the thermoplastic polyester resin (X-1), 80% or more of the dicarboxylic acid unit is a structural unit derived from terephthalic acid and 80 mol % or more of the diol unit is a structural unit derived from ethylene glycol. It is further preferred that 90% or more of the dicarboxylic acid unit is a structural unit derived from terephthalic acid and 90 mol % or more of the diol unit is a structural unit derived from ethylene glycol.

In the following description, the thermoplastic polyester resin (X-1) in which 50 mol % or more of the dicarboxylic acid unit is a structural unit derived from terephthalic acid and 50 mol % or more of the diol unit is a structural unit derived from ethylene glycol is also referred to as polyethylene terephthalate.

When the proportion of the structural unit derived from terephthalic acid in the dicarboxylic acid unit is 50 mol % or more as described above, the polyester resin is unlikely to be amorphous and thus the multilayer container is less likely to be thermally shrunk when, for example, filled therein with a hot material and heat resistance becomes favorable.

When polyethylene terephthalate (thermoplastic polyester resin (X-1)) is used as the thermoplastic polyester resin (X), the thermoplastic polyester resin (X) may be composed of polyethylene terephthalate alone, or may also contain a polyester resin other than polyethylene terephthalate in addition to polyethylene terephthalate. The thermoplastic polyester resin (X) contains preferably 80 to 100% by mass, more preferably 90 to 100% by mass of polyethylene terephthalate based on the total amount of the thermoplastic polyester resin (X).

Preferred embodiments of polyethylene terephthalate (polyester resin (X-1)) will be described below.

The polyethylene terephthalate may be one containing a structural unit derived from any other bifunctional compound than terephthalic acid and ethylene glycol, and examples of the bifunctional compound include the aforementioned aromatic dicarboxylic acids and aliphatic diols other than terephthalic acid and ethylene glycol, as well as other bifunctional compounds than aromatic dicarboxylic acids and aliphatic diols. On this occasion, the structural unit derived from the other bifunctional compound than terephthalic acid and ethylene glycol accounts for preferably 20 mol % or less, and more preferably 10 mol % or less relative to the total mol of the entire structural unit constituting the polyester resin.

Even when the polyester resin is other than polyethylene terephthalate, the polyester resin may include a structural unit derived from a bifunctional compound other than an aliphatic diol or an aromatic dicarboxylic acid.

Examples of the other bifunctional compound than aliphatic diols and aromatic dicarboxylic acids include other aliphatic bifunctional compounds than aliphatic diols and other aromatic bifunctional compounds than aromatic dicarboxylic acids.

Examples of the other aliphatic bifunctional compounds than aliphatic diols include linear or branched aliphatic bifunctional compounds. Specifically, examples thereof include aliphatic dicarboxylic acids, such as malonic acid, succinic acid, adipic acid, azelaic acid, sebacic acid, etc.; aliphatic hydroxycarboxylic acids, such as 10-hydroxyoctadecanoyl acid, lactic acid, hydroxyacrylic acid, 2-hydroxy-2-mehtylpropionic acid, hydoxybutyric acid, etc.; and the like.

The aforementioned aliphatic bifunctional compound may also be an alicyclic bifunctional compound. Examples thereof include alicyclic dicarboxylic acids, such as cyclohexanedicarboxylic acid, norbornenedicarboxylic acid, tricyclodecanedicarboxylic acid, etc.; alicyclic hydroxycarboxylic acids, such as hydroxymethyl cyclohexanecarboxylic acid, hydroxymethyl norbornenecarboxylic acid, hydroxymethyl tricyclodecanecarboxylic acid, etc.; and the like.

Among these, preferred examples of the alicyclic bifunctional compound include 1,2-cyclohexanedicarboxylic acid, 1,3-cyclohexanedicarboxylic acid, 1,4-cyclohexanedicarboxylic acid, and the like. The copolymerized polyester resin containing a structural unit derived from such an alicyclic bifunctional compound is easily produced, and it is possible to improve drop impact strength or transparency of the multilayer container. Among those described above, 1,4-cyclohexanedicarboxylic acid is more preferred because it is readily available, and high drop impact strength is obtainable therefrom.

Though the other aromatic bifunctional compound than aromatic dicarboxylic acids is not particularly limited, specific examples thereof include aromatic hydroxycarboxylic acids, such as hydroxybenzoic acid, hydroxytoluic acid, hydroxynaphthoic acid, 3-(hydroxyphenyl) propionic acid, hydroxyphenylacetic acid, 3-hydroxy-3-phenylpropionic acid, etc.; and aromatic diols, such as bisphenol compounds, hydroquinone compounds, etc.

In the case where the polyethylene terephthalate contains a structural unit derived from an aromatic dicarboxylic acid other than terephthalic acid, the aromatic dicarboxylic acid is preferably selected from the group consisting of isophthalic acid, orthophthalic acid, naphthalenedicarboxylic acid, and 4,4'-biphenyldicarboxylic acid. These compounds are low in costs, and a copolymerized polyester resin containing one member of these compounds is easily produced. In the case where the polyethylene terephthalate contains a structural unit derived from such an aromatic dicarboxylic acid, the proportion of the structural unit derived from an aromatic dicarboxylic acid is preferably 1 to 20 mol %, and more preferably 1 to 10 mol % of the dicarboxylic acid unit.

Among these, the aromatic dicarboxylic acid is especially preferably isophthalic acid or naphthalenedicarboxylic acid, and most preferably isophthalic acid. The polyethylene terephthalate containing a structural unit derived from isophthalic acid is excellent in moldability and is excellent from the standpoint of preventing blushing of a molded article to be caused due to the matter that a crystallization rate becomes slow. In addition, the polyethylene terephthalate containing a structural unit derived from naphthalenedicarboxylic acid increases a glass transition point of the resin, improves the heat resistance, and absorbs an ultraviolet ray, and therefore, it is suitably used for the production of a multilayer container which is required to be resistant to an ultraviolet ray. As the naphthalenedicarboxylic acid, a 2,6-naphthalenedicarboxylic acid component is preferred because it is easily produced and is high in economy.

Polyethylene terephthalate may include a diethylene glycol unit, which is a dimer of an ethylene glycol component and a by-product produced in a small amount in the production of polyethylene terephthalate. It is preferred that for the multilayer container to maintain favorable physical properties, the proportion of the diethylene glycol unit in the polyester resin is as low as possible. The proportion of the structural unit derived from diethylene glycol is preferably 3 mol % or less, more preferably 2 mol % or less and further preferably 1 mol % or less based on all of the structural units in the polyester resin.

The thermoplastic polyester resin (X) may include another thermoplastic polyester resin in addition to the polyester resin (X-1) described above. Examples of other thermoplastic polyester resins include a polyester resin (X-2) composed of a structural unit derived from a dicarboxylic acid and a structural unit derived from a diol, in which 80 mol % or more (preferably 85 mol % or more, more preferably 90 mol % or more, and further preferably 95 mol % or more) of the structural unit derived from a dicarboxylic acid is derived from at least one selected from terephthalic acid, naphthalene dicarboxylic acid and an ester thereof, 5 to 60 mol % (preferably 15 to 60 mol %) of the structural unit derived from a diol is derived from spiroglycol and 95 to 40 mol % (preferably 85 to 40 mol %) thereof is derived from ethylene glycol.

The polyester resin (X-2) is preferably an amorphous polyester resin.

Another example of other amorphous polyester resins includes a polyester resin (X-3) composed of a structural unit derived from a dicarboxylic acid and a structural unit derived from a diol, in which 80 mol % or more (preferably 85 mol % or more, more preferably 90 mol % or more, and further preferably 95 mol % or more) of the structural unit derived from a dicarboxylic acid is derived from at least one selected from terephthalic acid, naphthalene dicarboxylic acid and an ester thereof, 90 to 10 mol % (preferably 85 to 40 mol %) of the structural unit derived from a diol is derived from 1,4-cyclohexane dimethanol and 10 to 90 mol % (preferably 15 to 60 mol %) thereof is derived from ethylene glycol.

Examples of the thermoplastic polyester resin (X) include the polyester resins described in paragraphs 0010 to 0021 of JP 2006-111718 A, the polyester resins described in JP 2017-105873, and the polyester resins described in International Publication No. 2013/168804, the contents of which are incorporated herein by reference.

The thermoplastic polyester resin (X) may contain a structural unit derived from a monofunctional compound such as monocarboxylic acid and monoalcohol. Specific examples of such a compound include aromatic monofunctional carboxylic acid, such as benzoic acid, σ-methoxybenzoic acid, m-methoxybenzoic acid, p-methoxybenzoic acid, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 2,4,6-trimethylbenzoic acid, 2,4,6-trimethoxybenzoic acid, 3,4,5-trimethoxybenzoic acid, 1-naphthoic acid, 2-naphthoic acid, 2-biphenylcarboxylic acid, 1-naphthaleneacetic acid, 2-naphthaleneacetic acid, etc.; aliphatic monocarboxylic acids, such as propionic acid, butyric acid, n-octanoic acid, n-nonanoic acid, myristic acid, pentadecanoic acid, stearic acid, oleic acid, linoleic acid, linolenic acid, etc.; aromatic monoalcohols, such as benzyl alcohol, 2,5-dimethylbenzyl alcohol, 2-phenethyl alcohol, phenol, 1-naphthol, 2-naphthol, etc.; aliphatic or alicyclic monoalcohols, such as butyl alcohol, hexyl alcohol, octyl alcohol, pentadecyl alcohol, stearyl alcohol, a polyethylene glycol monoalkyl ether, a polypropylene glycol monoalkyl ether, a polytetramethylene glycol monoalkyl ether, oleyl alcohol, cyclododecanol, etc.; and the like.

Among these, from the viewpoints of easiness of the production of polyester and production costs thereof, benzoic acid, 2,4,6-trimethoxybenzoic acid, 2-naphthoic acid, stearic acid, and stearyl alcohol are preferred. The proportion of the structural unit derived from the monofunctional compound is preferably 5 mol % or less, more preferably 3 mol % or less, and still more preferably 1 mol % or less relative to the total mol of the entire structural unit of the polyester resin. The monofunctional compound functions as a terminal-sealing agent for end groups or branched chains of the polyester resin molecular chain, thereby suppressing an excessive increase of the molecular weight of the polyester resin and preventing gelation from occurring.

Furthermore, in order to obtain necessary physical properties, the thermoplastic polyester resin (X) may contain, as a copolymerization component, a polyfunctional compound having at least three groups selected from a carboxy group, a hydroxy group, and an ester-forming group thereof. Examples of the polyfunctional compound include aromatic polycarboxylic acids, such as trimesic acid, trimellitic acid, 1,2,3-benzenetricarboxylic acid, pyromellitic acid, 1,4,5,8-naphthalenetetracarboxylic acid, etc.; alicyclic polycarboxylic acids, such as 1,3,5-cyclohexanetricarboxylic acid, etc.; aromatic polyhydric alcohols, such as 1,3,5-trihydroxybenzene, etc.; aliphatic or alicyclic polyhydric alcohols, such as trimethylolpropane, pentaerythritol, glycerin, 1,3,5-cyclohexanetriol, etc.; aromatic hydroxycarboxylic acids, such as 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechuic acid, gallic acid, 2,4-dihydroxyphenylacetic acid, etc.; aliphatic hydroxycarboxylic acids, such as tartaric acid, malic acid, etc.; and esters thereof.

The proportion of the structural unit derived from a polyfunctional compound in the polyester resin is preferably less than 0.5 mol % relative to the total molar number of the entire structural unit of the polyester.

Among those mentioned above, from the viewpoints of reactivity and production costs, examples of the preferred polyfunctional compound include trimellitic acid, pyromellitic acid, trimesic acid, trimethylolpropane, and pentaerythritol.

For the production of the thermoplastic polyester resin (X), a known method, such as direct esterification and trans-esterification, may be applied. Examples of a polycondensation catalyst which is used at the time of production of the polyester resin may include known antimony compounds, such as antimony trioxide, antimony pentoxide, etc.; known germanium compounds, such as germanium oxide, etc.; known aluminum compounds, such as aluminum chloride, etc.; and the like, to which, however, the polycondensation catalyst is not limited. In addition, examples of other production method include a method of subjecting polyester resins of a different kind from each other to trans-esterification through long residence time and/or high-temperature extrusion.

The thermoplastic polyester resin (X) may include a regenerated polyester resin, or a material derived from a used polyester or an industrially recycled polyester (for example, a polyester monomer, a catalyst, and an oligomer).

The polyester resin may be used alone, or may be used in combination of two or more resins.

The intrinsic viscosity of the thermoplastic polyester resin (X) is not particularly limited, and is preferably 0.5 to 2.0 dL/g, and more preferably 0.6 to 1.5 dL/g. When the intrinsic viscosity is 0.5 dL/g or more, the polyester resin has a sufficiently high molecular weight, and thus the multilayer container can reveal mechanical properties required for a structure.

The intrinsic viscosity is one measured by dissolving a polyester resin as a measurement object in a mixed solvent of phenol/1,1,2,2-tetrachloroethane (=6/4 mass ratio) to prepare 0.2, 0.4, and 0.6 g/dL solutions, followed by measurement at 25° C. with an automatic kinematic viscosity tester (Viscotek, manufactured by Malvern Instruments Limited).

<Polyamide Layer>

The multilayer container of the present invention comprises a polyamide layer comprising a specific polyamide resin (Y-1) as a polyamide resin (Y). The polyamide layer constitutes an interlayer. Furthermore, when the total thickness is 100%, the polyamide layer is at a position preferably 5 to 60% from the inner surface of the multilayer container, and more preferably 5 to 35% from the inner surface of the multilayer container. The thickness of the polyamide layer is preferably 1 to 15%

In the present invention, since the multilayer container comprises the polyamide resin layer comprising the above specific polyamide resin (Y-1), the multilayer container has a high barrier property. Thus, penetration of oxygen from outside through the wall of the container can be prevented. Furthermore, as described later, a surprisingly higher oxygen barrier property is shown and delamination from the polyester layer can be suppressed when a polyamide layer having a specific thickness is disposed at a specific position.

The polyamide resin (Y) which the polyamide layer comprises will be described in detail.

(Polyamide Resin (Y))

The polyamide resin (Y) comprises a polyamide resin (Y-1) comprising a structural unit derived from a diamine (hereinafter also referred to as a "diamine unit") and a structural unit derived from a dicarboxylic acid (hereinafter also referred to as a "dicarboxylic acid unit"), in which 70 mol % or more of the structural unit derived from a diamine (diamine unit) is a structural unit derived from xylylenediamine; and 70 mol % or more of the structural unit derived from a dicarboxylic acid (dicarboxylic acid unit) is a structural unit derived from an α,ω-linear aliphatic dicarboxylic acid having 4 to 20 carbon atoms.

In the present invention, the polyamide resin (Y-1) comprises preferably 70 mol % or more, more preferably 80 to 100 mol %, and further preferably 90 to 100 mol % of a structural unit derived from xylylenediamine out of the structural units derived from a diamine (diamine units).

Though the xylylenediamine is preferably metaxylylenediamine, paraxylylenediamine, or a mixture thereof, it is more preferably metaxylylenediamine. The diamine unit constituting the polyamide resin contains a structural unit derived from metaxylylenediamine in a proportion of preferably 50 mol % or more, more preferably 70 mol % or more, still more preferably 80 to 100 mol %, and yet still more preferably 90 to 100 mol %. When the structural unit derived from metaxylylenediamine in the diamine unit falls within the aforementioned range, the polyamide resin (Y-1) becomes more favorable in terms of a gas barrier property.

Though the diamine unit in the polyamide resin (Y-1) is composed of only the structural unit derived from xylylenediamine, it may contain a structural unit derived from other diamine than the xylylenediamine. Here, examples of the other diamine than the xylylenediamine may include aliphatic diamines having a linear or branched structure, such as ethylenediamine, tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, 2,4,4-trimethyl-hexamethylenediamine, etc.; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl) methane, 2,2-bis(4-aminocyclohexyl) propane, bis(aminomethyl) decalin, bis(aminomethyl)tricyclodecane, etc.; diamines having an aromatic ring, such as bis(4-aminophenyl) ether, paraphenylenediamine, bis(aminomethyl) naphthalene, etc.; and the like, to which, however, the diamine unit is not limited.

In the polyamide resin (Y-1), 70 mol % or more of the structural unit derived from a dicarboxylic acid is an α, ω-linear aliphatic dicarboxylic acid having 4 to 20 carbon atoms. Examples of the α, ω-linear aliphatic dicarboxylic acid having 4 to 20 carbon atoms include succinic acid, glutaric acid, adipic acid, pimelic acid, suberic acid, azelaic acid, sebacic acid, undecandioic acid and dodecanedioic acid. Of them, adipic acid and sebacic acid are preferred.

The polyamide resin (Y-1) contains, 70 mol % or more, preferably 80 to 100 mol %, and further preferably 90 to 100 mol % of a structural unit derived from an α,ω-linear aliphatic dicarboxylic acid having 4 to 20 carbon atoms out of the structural units derived from a dicarboxylic acid.

The dicarboxylic acid unit in the polyamide resin (Y-1) may be composed of a structural unit derived from an α,ω-linear aliphatic dicarboxylic acid having 4 to 20 carbon atoms alone, or may also contain a structural unit other than the structural unit derived from an α, ω-linear aliphatic dicarboxylic acid having 4 to 20 carbon atoms.

Examples of the dicarboxylic acids other than α,ω-linear aliphatic dicarboxylic acids having 4 to 20 carbon atoms include, but are not limited to, alicyclic dicarboxylic acids such as 1,4-cyclohexanedicarboxylic acid; other aliphatic dicarboxylic acids such as dimer acid; and aromatic dicarboxylic acids such as terephthalic acid, isophthalic acid, orthophthalic acid, xylylenedicarboxylic acid and naphthalene dicarboxylic acid.

In the polyamide resin (Y-1), it is especially preferred that not only 70 mol % or more of the diamine unit is a structural unit derived from xylylenediamine (preferably metaxylylenediamine), but also 70 mol % or more of the dicarboxylic acid unit is a structural unit derived from adipic acid; and it is most preferred that not only 80 mol % or more of the diamine unit is a structural unit derived from xylylenediamine (preferably metaxylylenediamine), but also 80 mol % or more of the dicarboxylic acid unit is a structural unit derived from adipic acid. The polyamide resin (Y-1) having such a structural unit has a favorable gas barrier property and has molding processability similar to that of the thermoplastic polyester resin (X) such as polyethylene terephthalate, and thus the multilayer container has favorable processability. In the polyamide resin (Y-1), one or more of α,ω-linear aliphatic dicarboxylic acids having 4 to 20 carbon atoms (excluding adipic acid) is preferably used as a compound constituting the dicarboxylic acid unit other than adipic acid.

As the preferred polyamide resin (Y-1), a polyamide resin, in which 70 mol % or more of the diamine unit is a structural unit derived from xylylenediamine (preferably metaxylylenediamine), 70 to 99 mol % of the dicarboxylic acid unit is a structural unit derived from adipic acid, and 1 to 30 mol % of the dicarboxylic acid unit is a structural unit derived from isophthalic acid, may also be exemplified. It is more preferred that in the polyamide resin, 80 mol % or more of the diamine unit is a structural unit derived from xylylenediamine (preferably metaxylylenediamine), 80 to 99 mol % of the dicarboxylic acid unit is a structural unit derived from adipic acid, and 1 to 20 mol % thereof is a structural unit derived from isophthalic acid.

When the isophthalic acid unit is added as the dicarboxylic acid unit, the melting point is decreased, whereby the molding processing temperature can be decreased, and therefore, thermal deterioration during molding can be suppressed. In addition, by delaying the crystallization time, the stretch moldability is improved.

The polyamide resin (Y-1) has a number average molecular weight of preferably 10,000 or more, more preferably 15,000 or more, and preferably 100,000 or less, more preferably 50,000 or less, and further preferably 40,000 or less from the viewpoint of moldability and oxygen barrier property. The number average molecular weight is measured by the method disclosed in paragraph 0016 of International Publication No. 2017/090556.

It is preferred that the polyamide resin (Y-1) is a crystalline resin. The polyamide resin (Y-1) has a melting point of preferably 190° C. or more and 300° C. or less, more preferably 200° C. or more and 270° C. or less, and further preferably 210° C. or more and 250° C. or less from the viewpoint of easiness of molding.

The polyamide resin (Y-1) has a glass transition temperature of preferably 75 to 95° C. from the viewpoint of easiness of molding.

In the present invention, the content of the polyamide resin (Y-1) in the polyamide resin (Y) is preferably 20% by mass or more, more preferably 30% by mass or more, further preferably 50% by mass or more, still more preferably 60% by mass or more, still further preferably 70% by mass or more, and may be 100% by mass from the viewpoint of oxygen barrier property.

In the present invention, the polyamide resin (Y) may include another polyamide resin in addition to the polyamide resin (Y-1). Examples of the another polyamide resin include a polyamide resin (Y-2) comprising a structural unit derived from a diamine and a structural unit derived from dicarboxylic acid, in which 70 mol % or more of the structural unit derived from a diamine is derived from xylylenediamine, 30 to 65 mol % of the structural unit derived from a dicarboxylic acid is derived from a α, ω-linear aliphatic dicarboxylic acid having 4 to 20 carbon atoms, and 70 to 35 mol % thereof is derived from isophthalic acid (provided that the total is less than 100 mol %).

Transparency and oxygen barrier property can be improved when such a polyamide resin (Y-2) is blended. The polyamide resin (Y-2) used in the present invention is usually an amorphous resin. By using the amorphous resin, transparency of the multilayer container can be further improved.

In the polyamide resin (Y-2), 70 mol % or more, preferably 80 mol % or more, more preferably 90 mol % or more, further preferably 95 mol % or more, still more preferably 99 mol % or more of the structural unit derived from a diamine is derived from xylylenediamine. Metaxylylenediamine and paraxylylenediamine are preferred as xylylenediamine, and metaxylylenediamine is more preferred.

A preferred embodiment of the polyamide resin (Y-2) in the present invention is a polyamide resin in which 70 mol % or more of the structural unit derived from a diamine is derived from metaxylylenediamine.

Examples of the diamine other than xylylenediamine include aromatic diamines such as paraphenylendiamine, and aliphatic diamines such as 1,3-bis(aminomethyl)cyclohexane, 1,4-bis(aminomethyl)cyclohexane, tetramethylenediamine, pentamethylenediamine, hexamethylenediamine, octamethylenediamine and nonamethylenediamine. These other diamines may be alone or two or more.

When diamine other than xylylenediamine is used as a diamine component, diamine other than xylylenediamine is used in a proportion of 30 mol % or less, more preferably 1 to 25 mol % and particularly preferably 5 to 20 mol % based on the structural units derived from diamine.

In the present invention, 30 to 65 mol % of the structural unit derived from a dicarboxylic acid in the polyamide resin (Y-2) is derived from an α, ω-linear aliphatic dicarboxylic acid having 4 to 20 carbon atoms (preferably an α,ω-linear aliphatic dicarboxylic acid having 4 to 8 carbon atoms, more preferably adipic acid), and 70 to 35 mol % thereof is derived from isophthalic acid.

The lower limit value of the proportion of isophthalic acid out of all the dicarboxylic acids constituting the structural unit derived from a dicarboxylic acid in the polyamide resin (Y-2) is 35 mol % or more, preferably 40 mol % or more and more preferably 41 mol % or more. The upper limit value of the proportion of isophthalic acid is 70 mol % or less, preferably 67 mol % or less, more preferably 65 mol % or less, further preferably 62 mol % or less, still more preferably 60 mol % or less, and still further preferably 58 mol % or less.

When the lower limit value and the upper limit value of the proportion are set to the above range, oxygen barrier property of the multilayer container of the present invention tends to be improved.

The lower limit value of the proportion of an α, ω-linear aliphatic dicarboxylic acid having 4 to 20 carbon atoms (preferably an α,ω-linear aliphatic dicarboxylic acid having 4 to 8 carbon atoms, more preferably adipic acid) out of all the dicarboxylic acids constituting the structural unit derived from a dicarboxylic acid in the polyamide resin (Y-2) is 30 mol % or more, preferably 35 mol % or more, more preferably 38 mol % or more, further preferably 40 mol % or more, and may be 42 mol % or more. The upper limit value of the proportion of an α,ω-linear aliphatic dicarboxylic acid having 4 to 20 carbon atoms is 65 mol % or less, preferably 60 mol % or less and more preferably 59 mol % or less. When the lower limit value and the upper limit value of the proportion are set to the above range, oxygen barrier property of the multilayer container of the present invention tends to be improved.

The α,ω-linear aliphatic dicarboxylic acid having 4 to 20 carbon atoms is preferably an α,ω-linear aliphatic dicarboxylic acid having 4 to 8 carbon atoms as described above.

Preferred examples of the α,ω-linear aliphatic dicarboxylic acid having 4 to 20 carbon atoms which are used as a raw material dicarboxylic acid component of the polyamide resin (Y-2) include aliphatic dicarboxylic acids such as succinic acid, glutaric acid, pimelic acid, suberic acid, azelaic acid, adipic acid, sebacic acid, undecandioic acid and dodecanedioic acid. One of them may be used or two or more of them may be used in combination. Of them, adipic acid is preferred because the melting point of the polyamide resin is within the range suitable for molding processing.

The sum of the proportion of isophthalic acid and the α, ω-linear aliphatic dicarboxylic acid having 4 to 20 carbon atoms out of all the dicarboxylic acids constituting the structural unit derived from a dicarboxylic acid in the polyamide resin (Y-2) is preferably 90 mol % or more, more preferably 95 mol % or more, further preferably 98 mol % or more, and may be 100 mol % or more. When the sum of the proportion is set to the above range, transparency of the multilayer container of the present invention tends to be improved.

Examples of the dicarboxylic acid other than isophthalic acid or the α,ω-linear aliphatic dicarboxylic acid having 4 to 20 carbon atoms include phthalic acid compounds such as terephthalic acid and orthophthalic acid and isomers of naphthalene dicarboxylic acids such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid and 2,7-naphthalenedicarboxylic acid. One of them may be used or two or more of them may be used in combination.

It is preferred that the polyamide resin (Y-2) contains substantially no structural units derived from terephthalic acid. Containing substantially no structural units derived from terephthalic acid means that the proportion of the structural unit derived from terephthalic acid is 5 mol % or less, preferably 3 mol % or less and further preferably 1 mol % or less based on the molar quantity of isophthalic acid in the polyamide resin (Y-2). This configuration maintains moderate molding processability and makes gas barrier property less likely to change due to humidity.

While the polyamide resin (Y-2) is composed of a structural unit derived from a dicarboxylic acid and a structural unit derived from a diamine, it may also comprise a structural unit other than the structural unit derived from a dicarboxylic acid or the structural unit derived from a diamine, and other moieties such as a terminal group. Examples of the other structural unit include, but are not limited to, structural units derived from lactam such as &-caprolactam, valerolactam, laurolactam and undecalactam and an aminocarboxylic acid such as 11-aminoundecanoic acid and 12-aminododecanoic acid. The polyamide resin (Y-2) also includes a trace component such as an additive used for synthesis. The polyamide resin (Y-2) comprises usually 95% by mass or more, and preferably 98% by mass or more of a structural unit derived from a dicarboxylic acid or a structural unit derived from a diamine.

The polyamide resin (Y-2) has a number average molecular weight (Mn) of preferably 8,000 or more, and more preferably 10,000 or more. The upper limit value of the number average molecular weight of the polyamide resin (Y-2) is not particularly defined, and is for example, 50,000 or less, may be 30,000 or less or 20,000 or less. In an embodiment of the present invention, Mn of the polyamide resin (Y-2) is smaller than Mn of the polyamide resin (Y-1). Mn of the polyamide resin (Y-2) is preferably 5,000 or more smaller, more preferably 8,000 or more smaller, and further preferably 10,000 or more smaller than Mn of the polyamide resin (Y-1). The upper limit of the difference between Mn of the polyamide resin (Y-2) and Mn of the polyamide resin (Y-1) is, for example, 25,000 or less. This configuration improves dispersibility and compatibility of the polyamide resin (Y-1) and the polyamide resin (Y-2), and tends to make transparency and gas barrier property more excellent.

The glass transition temperature of the polyamide resin (Y-2) is preferably more than 90° C. and 150° C. or less, more preferably 95 to 145° C., further preferably 101 to 140° C., and still further preferably 120 to 135° C. This configuration tends to improve delamination resistance of the multilayer container.

In the present invention, the content of the polyamide resin (Y-2) in the polyamide resin (Y) is preferably 10% by mass or more, more preferably 20% by mass or more, and further preferably 30% by mass or more, and preferably 80% by mass or less, more preferably 70% by mass or less, and further preferably 50% by mass or less from the viewpoint of delamination resistance, transparency and barrier property.

In the present invention, the total content of the polyamide resin (Y-1) and the polyamide resin (Y-2) in the polyamide resin (Y) is preferably 50% by mass or more, more preferably 70% by mass or more, further preferably 90% by mass or more and may be 100% by mass.

The polyamide resin (Y-1) and the polyamide resin (Y-2) may be used alone, respectively, or two or more of them may be used in combination.

Besides the aforementioned diamine and dicarboxylic acid, as components constituting the polyamide resin (Y), a lactam, such as ε-caprolactam, laurolactam, etc.; an aliphatic aminocarboxylic acid, such as aminocaproic acid, aminoundecanoic acid, etc.; or an aromatic aminocarboxylic acid, such as p-aminomethylbenzoic acid, may also be used as the copolymerization component within a range where the effects of the present invention are not impaired.

It is preferred that in the present invention, the polyamide resin is produced through a polycondensation reaction in the molten state (hereinafter also referred to as "melt polycondensation"). For example, it is preferred that the polyamide resin is produced by a method in which a nylon salt composed of a diamine and a dicarboxylic acid is subjected to temperature rise by means of pressurization in the presence of water and polymerized in the molten state while removing the water added and condensed water. In addition, the polyamide resin may also be produced by a method in which the diamine is added directly to the dicarboxylic acid in the molten state, and the contents are polycondensed under atmospheric pressure. In this case, in order to hold the reaction system in a uniform liquid state, it is preferred that the diamine is continuously added to the dicarboxylic acid, and meanwhile, the polycondensation is allowed to proceed while subjecting the reaction system to temperature rise such that the reaction temperature does not drop lower than the melting points of the produced oligoamide and polyamide. The molecular weight of the polyamide resin may also be increased by further subjecting the product obtained through melt polycondensation to solid-phase polymerization, as the need arises.

The polyamide resin may be subjected to polycondensation in the presence of a phosphorus atom-containing compound. When the polyamide resin is subjected to polycondensation in the presence of a phosphorus atom-containing compound, the processing stability at the time of melt molding is enhanced, and coloration is readily suppressed.

Preferred specific examples of the phosphorus atom-containing compound include a hypophosphorous acid compound (also referred to as a phosphonic acid compound or a phosphonous acid compound) and a phosphorous acid compound (also referred to as a phosphonic acid compound), to which, however, the compound is not particularly limited. Though the phosphorus atom containing-compound may be an organic metal salt, above all, an alkali metal salt is preferred.

Specific examples of the hypophosphorous acid compound include hypophosphorous acid; metal salts of hypophosphorous acid, such as sodium hypophosphite, potassium hypophosphite, lithium hypophosphite, calcium hypophosphite, etc.; hypophosphorous acid compounds, such as ethyl hypophosphite, dimethylphosphinic acid, phenylmethylphosphinic acid, phenylphosphonous acid, ethyl phenylphosphonite, etc.; metal salts of phenylphosphonous acid, such as sodium phenylphosphonite, potassium phenylphosphonite, lithium phenylphosphonite, etc.; and the like.

Specific examples of the phosphorus acid compound include phosphorous acid and pyrophosphorous acid; metal salts of phosphorous acid such as sodium hydrogen phosphite, sodium phosphite, potassium phosphite, calcium phosphite; phosphorous acid compounds such as triethyl phosphite, triphenyl phosphite, ethylphosphonic acid, phenylphosphonic acid, diethyl phenylphosphonate, sodium ethylphosphonate; potassium ethylphosphonate; metal salts of phenylphosphonic acid such as sodium phenylphosphonate, potassium phenylphosphonate, lithium phenylphosphonate.

Among those, the phosphorus atom-containing compound may be used alone, or may be used in combination of two or more. Among those, from the viewpoint of an effect for promoting the polymerization reaction of the polyamide resin as well as the viewpoint of an effect for preventing coloration from occurring, metal salts of hypophosphorous acid, such as sodium hypophosphite, potassium hypophosphite, lithium hypophosphite, calcium hypophosphite, etc. are preferred, with sodium hypophosphite being more preferred.

It is preferred that the polycondensation of the polyamide resin is conducted in the presence of a phosphorus atom-containing compound and an alkali metal compound. In order to prevent coloration of the polyamide resin during the polycondensation from occurring, it is necessary to make a sufficient amount of the phosphorus atom-containing compound exist. However, if the use amount of the phosphorus atom-containing compound is excessively large, there is a concern that an amidation reaction rate is excessively promoted, so that gelation of the polyamide resin is brought. For that reason, from the viewpoint of regulating the amidation reaction rate, it is preferred to make an alkali metal compound coexist.

Though the alkali metal compound is not particularly limited, preferably, specific examples thereof may include alkali metal hydroxides and alkali metal acetates. Examples of the alkali metal hydroxide may include lithium hydroxide, sodium hydroxide, potassium hydroxide, rubidium hydroxide, and cesium hydroxide; and examples of the alkali metal acetate may include lithium acetate, sodium acetate, potassium acetate, rubidium acetate, and cesium acetate.

In the case of using the alkali metal compound on the occasion of polycondensation of the polyamide resin, from the viewpoint of suppressing the formation of a gel, the use amount of the alkali metal compound is within a range of preferably from 0.5 to 1, more preferably from 0.55 to 0.95, and still more preferably from 0.6 to 0.9 in terms of a value obtained by diving the molar number of the alkali metal compound by the molar number of the phosphorus atom-containing compound.

In the present invention, from the viewpoint of improving recyclability of polyester resin, namely, suppressing the yellowing of the regenerated polyester resin, an amino group concentration of the polyamide resin (Y) is preferably 50 μmol/g or less, more preferably 45 μmol/g or less, further preferably 40 μmol/g or less, still further preferably 30 μmol/g or less, and especially preferably 20 μmol/g or less.

The amino group concentration of the polyamide resin is determined in a manner in which the polyamide resin is precisely weighed and dissolved in a phenol/ethanol (4/1 by volume) solution at 20 to 30° C. while stirring, after the polyamide resin is completely dissolved, the inner wall of the container is washed away with 5 mL of methanol while stirring, and the resultant is subjected to neutralization titration with a 0.01 mol/L hydrochloric acid aqueous solution.

Though a method of regulating the amino group concentration of the polyamide resin is not particularly limited, the amino group concentration can be controlled low by a method in which a charge ratio (molar ratio) of the diamine and the dicarboxylic acid is regulated to undergo the polycondensation reaction; a method in which a monocarboxylic acid capable of capping an amino group is charged together with the diamine and the dicarboxylic acid to undergo the polycondensation reaction; a method in which after undergoing the polycondensation reaction, the resultant is allowed to react with a carboxylic acid capable of capping an amino group; or the like.

(Transition Metal)

In the present invention, the polyamide layer may contain a transition metal for the purpose of inducing an oxidation reaction of the polyamide resin (Y) to enhance an oxygen absorption ability and to more enhance the gas barrier property.

The transition metal is preferably at least one selected from the group consisting of a transition metal belonging to the Group VIII of the Periodic Table, manganese, copper, and zinc, and from the viewpoint of revealing oxygen absorption ability, the transition metal is more preferably at least one selected from the group consisting of cobalt, iron, manganese, and nickel, with cobalt being still more preferred.

The transition metal is used as an elemental substance, and besides, it is used in a form of a low-valence oxide, an inorganic acid salt, an organic acid salt, or a complex salt each containing the aforementioned metal. The transition metal is preferably an inorganic acid salt, an organic acid salt or a complex salt, and more preferably an organic acid salt. Examples of the inorganic acid salt include halides, such as a chloride, a bromide, etc., carbonates, sulfates, nitrates, phosphates, silicates, and the like. Meanwhile, examples of the organic acid salt include carboxylates, sulfonates, phosphonates, and the like. In addition, transition metal complexes with a β-diketone or a β-keto acid ester or the like can also be utilized.

From the viewpoint of favorably revealing oxygen absorption ability, it is preferred to use at least one selected from the group consisting of a carboxylate, a carbonate, an acetylacetonate complex, an oxide, and a halide each containing a transition metal; it is more preferred to use at least one selected from the group consisting of an octanoate, a neodecanoate, a naphthenate, a stearate, an acetate, a carbonate, and an acetylacetonate complex each containing a transition metal; and it is still more preferred to use a cobalt carboxylate, such as cobalt octanoate, cobalt naphthenate, cobalt acetate, cobalt stearate, etc.

The aforementioned transition metal may be used alone, or may be used in combination of two or more.

From the viewpoint of enhancing the gas barrier property and suppressing the yellowing of the multilayer container, the content of the transition metal in the polyamide layer is preferably 100 to 1,000 ppm by mass, more preferably 120 to 800 ppm by mass, further preferably 150 to 600 ppm by mass, and still further preferably 200 to 500 ppm by mass.

In the case of using a carboxylate containing a transition metal, the content of the transition metal means the content of the transition metal per se in the compound containing the foregoing transition metal.

(Other Components)

The polyester layer and the polyamide layer may contain various types of additive components. Examples of the additive component include a coloring agent, a heat stabilizer, a light stabilizer, a moisture proof agent, a waterproof agent, a lubricant, a spreader, and the like.

Each of the polyester resin layer and the polyamide resin layer may contain other resin component than the polyester resin and the polyamide resin within a range where the object of the present invention is not deviated. In the polyester layer, the polyester resin (X) serves as a main component, and specifically, the content of the polyester resin (X) is preferably 80 to 100% by mass, and more preferably 90 to 100% by mass relative to the resin amount of the entire layer.

The content of the polyamide resin (Y) in the polyamide layer is preferably 50 to 100% by mass, more preferably 70 to 100% by mass, further preferably 80 to 100% by mass and still more preferably 90 to 100% by mass relative to the resin amount of the entire layer.

It is preferred that the polyester resin layer contains a coloring agent, and from the standpoint of functioning as a complementary color against the yellowing, it is preferred that the polyester resin layer contains a blue or purple coloring agent. The content of the blue or purple coloring agent in the polyester layer is preferably 0.1 to 100 ppm by mass, more preferably 0.5 to 50 ppm by mass, and further preferably 1 to 30 ppm by mass relative to the polyester resin.

<Multilayer Container>

The multilayer container of the present invention is preferably a hollow container, and in the case where the multilayer container is a hollow container, a body thereof has at least a multilayer laminated structure.

The multilayer container of the present invention comprises a polyester layer and a polyamide layer, and the polyester layer is an innermost layer and the polyamide layer is an interlayer. It is preferred that the multilayer container of the present invention comprises at least an innermost polyester layer and a polyamide layer provided in direct contact with the polyester layer.

It is preferred that the multilayer container of the present invention comprises a polyester layer on the outside of the polyamide layer in addition to the innermost layer. In other words, it is preferred that the multilayer container comprises at least one polyester layer on the inside and the outside of the polyamide layer. It is preferred that the multilayer container comprises a polyester layer on the outside of the polyamide layer in direct contact with the polyamide layer. The polyester layer on the outside of the polyamide layer is not always the outermost layer, and a plurality of layers may be provided on the outside of the polyester layer.

It is especially preferred that of the above, the multilayer container of the present invention has a three-layer structure of a polyester layer as the innermost layer and the outermost layer and a polyamide layer as an interlayer.

The multilayer container of the present invention may comprise other layers than the polyester layer and the polyamide layer. Specifically, example of other layers include a resin layer and an adhesive layer made to intervene between the polyester layer and the polyamide layer to bond the layers. It is preferable, however, that no resin layer or adhesive layer is made to intervene between the polyester layer and the polyamide layer from the viewpoint of improving molding processability and separation for recycling.

In the multilayer container of the present invention, the stretching ratio in the transverse direction (TD) is 2.2 times or more, and the stretching ratio in the machine direction (MD) to the stretching ratio in the transverse direction (TD) (MD/TD) is 0.6 or more and less than 1.0. Having been stretched in that range, the multilayer container of the present invention has excellent oxygen barrier property and delamination resistance.

The multilayer container of the present invention is obtained preferably by stretch blowing, and is produced more preferably by injection blow molding in which biaxial stretch blow molding is performed. In other words, the multilayer container of the present invention is preferably a stretch blow molding container, and more preferably a biaxial stretch blow molding container.

In the present invention, the machine direction (MD) of the multilayer container means the direction extending from the mouth to the bottom of the container. The transverse direction (TD) of the multilayer container means the circumferential direction of the container perpendicular to the machine direction. The stretching ratio in the transverse direction (TD) is calculated from the diameter of the body of the multilayer container at a height of 70 mm from the bottom of the multilayer container and the diameter of the body of a preform corresponding thereto before blow molding. The diameter of the bodies is measured starting from the center of the thickness. The stretching ratio in the machine direction (MD) is calculated from the length under the support ring of the multilayer container and the length under the support ring of a preform before blow molding.

The stretching ratio in the transverse direction (TD) of the multilayer container of the present invention is 2.2 times or more, preferably 3.0 times or more, more preferably 3.3 times or more from the viewpoint of improving oxygen barrier property and delamination resistance. When the capacity of the multilayer container of the present invention is 200 to 350 mL, the stretching ratio in the transverse direction (TD) of the multilayer container of the present invention is preferably 2.3 times or more, more preferably 2.6 times or more, further preferably 2.8 times or more, and still more preferably 3.0 times or more.

The stretching ratio in the machine direction (MD) of the multilayer container of the present invention is preferably 1.5 to 4.0 times, more preferably 2.0 to 3.0 times, and further preferably 2.1 to 2.5 times from the viewpoint of improving oxygen barrier property and delamination resistance.

The stretching ratio in the machine direction (MD) to the stretching ratio in the transverse direction (TD) (MD/TD) is 0.6 or more and less than 1.0, preferably 0.65 or more and 0.95 or less, more preferably 0.68 or more and 0.90 or less, further preferably 0.68 or more and 0.80 or less, still more preferably 0.68 or more and 0.75 or less, and more preferably 0.68 or more and 0.72 or less from the viewpoint of improving oxygen barrier property and delamination resistance.

When the stretching ratio is in the above range, the degree of orientation (average value) of the polyamide layer in the body of the multilayer container is preferably 20 to 45, and more preferably 25 to 45. Herein the degree of orientation is calculated from the refractive index of the polyamide layer measured at 23° C. using an Abbe refractometer by the following formula.

$$\text{Degree of orientation}=[\{n(x)+n(y)\}/2-n(z)]\times 1{,}000$$

(n (x): refractive index in the direction of the height of the bottle, n (y): refractive index in the circumferential direction of the bottle, n (z): refractive index in the thickness direction)

The degree of orientation is used as an index representing the state of orientation of polymer molecules, i.e., the degree of crystallinity. A higher degree of orientation represents a higher proportion of molecules stretched regularly. The degree of orientation of the polyamide layer is controlled by conditions of blowing. By properly controlling the primary blow pressure, the delay time in primary blow, the secondary blow pressure, the temperature of heating the surface of a multilayer preform and the like so that the degree of orientation is in the above range, the barrier layer can be uniformly stretched and strain of the barrier layer after blow molding can be increased. This improves adhesion of layers of the multilayer bottle and delamination resistance becomes favorable.

The capacity of the multilayer container is not particularly limited, and is preferably 30 mL or more and 3,000 mL or less, more preferably 50 mL or more and 2,000 mL or less, further preferably 100 mL or more and 1,500 mL or less, still more preferably 200 mL or more and 1,000 mL or less, still further preferably 200 mL or more and 600 mL or less, yet more preferably 200 mL or more and 350 mL or less, yet further preferably 200 mL or more and 330 mL or less, and particularly preferably 200 mL or more and 300 mL or less from the viewpoint of oxygen barrier property, and delamination resistance as well as production. Since the present invention is highly advantageous for a multilayer container having a relatively small capacity, it is preferred that the multilayer container has a relatively small capacity.

Since the total stretching ratio is small in a multilayer container having small capacity, delamination resistance is likely to be low. However, when the stretching ratio is in the range according to the present invention, stretching, in particular, in the circumferential direction delamination resistance becomes favorable even in a container having small capacity.

The total thickness of the multilayer container is in the range of preferably 50 to 500 μm, more preferably 100 to 450 μm, further preferably 150 to 400 μm, still more preferably 150 to 350 μm, still further preferably 150 to 300 μm, and yet more preferably 150 to 250 μm. When the multilayer container is a hollow container, the total thickness of the body of the hollow container (i.e., the total thickness of all the layers of the body) is in the range of preferably 50 to 500 μm, more preferably 100 to 450 μm, further preferably 150 to 400 μm, still more preferably 150 to 350 μm, still further preferably 150 to 300 μm, and yet more preferably 150 to 250 μm.

It is preferred that when the total thickness of the multilayer container of the present invention is taken as 100%, the polyamide layer is at a position 5 to 60% from the inner surface of the multilayer container. It is more preferred that the polyamide layer is at a position 5 to 35% from the inner surface of the multilayer container. It is preferred that the above requirement is satisfied at least a position of the body of the multilayer container, and it is more preferred that the above requirement is satisfied at the center of the body (the center in the direction of the height of the container).

It is preferred that when the multilayer container has a plurality of polyamide layers, at least one polyamide layer satisfies the above requirement. It is more preferred that the innermost polyamide layer satisfies the above requirement, and it is further preferred that the multilayer container comprises only one polyamide layer and the polyamide layer satisfies the above requirement.

It is preferred that when the total thickness of the multilayer container is taken as 100%, the polyamide layer is at a position 5 to 60% from the inner surface of the multilayer container. It is more preferred that the polyamide layer is at a position 5 to 35% from the inner surface of the multilayer container. When the polyamide layer is at a position 5 to 35% from the inner surface of the multilayer container, a multilayer container having excellent delamination resistance and excellent oxygen barrier property can be obtained. Furthermore, when the polyamide layer is at a position 5 to 35% from the inner surface of the multilayer container, electron beam reaches the polyamide layer even when the inside of the multilayer container is irradiated with electron beam as described later, and radicals are generated when the electron beam reaches the polyamide layer, improving oxygen barrier property. Furthermore, electron beam improves adhesion of the interface between the polyester layer and the polyamide layer, and thus delamination resistance is further improved.

When the total thickness of the multilayer container is taken as 100%, from the viewpoint described above, the polyamide layer is at a position preferably 5% or more, more preferably 5.5% or more, further preferably 6% or more, still more preferably 6.5% or more, still further preferably 8% or more, yet more preferably 10% or more, and yet further preferably 12% or more from the inner surface of the multilayer container. The polyamide layer is at a position preferably 60% or less, more preferably 50% or less, further preferably 35% or less, still more preferably 30% or less and still further preferably 20% or less.

Furthermore, when the total thickness of the multilayer container is taken as 100%, the thickness of the polyamide layer of the multilayer container of the present invention is preferably 1% or more, more preferably 1.5% or more, further preferably 2% or more, and preferably 15% or less, more preferably 12.5% or less, and further preferably 10% or less. When the thickness of the polyamide layer is in the above range, a sufficient oxygen barrier property can be obtained and an effect for improving delamination resistance can be expected.

Herein, the position and the thickness of the polyamide layer are measured by the following method.

A sample of 1.5 cm×1.5 cm was cut from a bottle at a position 70 mm from the bottom of the bottle in 4 horizontal directions (0°, 90°, 180°, 270°) by a cutter. The total thickness was measured by using a micrometer ("Quick Micro MDQ" manufactured by Mitutoyo Corporation) and the ratio of the thickness of the respective layers was measured by using a film thickness meter based on optical interference ("DC-8200" manufactured by Gunze Limited), and the position and thickness of the polyamide layer was calculated from the total thickness and the ratio of the thickness of the respective layers obtained.

The polyamide layer may not be stacked at the bottom or the neck of the multilayer container. The polyamide layer is located at least part of the body, preferably the central part of the body, and more preferably at a site 50% or more of the length of the body at the above position in the above thickness.

The content of the polyamide resin is preferably 0.5 to 12% by mass, more preferably 1 to 10% by mass, further preferably 1.5 to 8% by mass, and still more preferably 2 to 7% by mass based on the total amount of the polyester layer and the polyamide layer.

The induction period until a multilayer container comprising a polyester layer and a polyamide layer reveals the ability to absorb oxygen and the development period of absorption of oxygen vary depending on the position of the polyamide layer and the capacity of the multilayer container. It is preferred that the polyamide layer is usually at a position starting from the lower part of the support ring of a preform described later to about 20 to 40 mm from the center of the injection gate for the preform from the viewpoint of balancing delamination resistance and ability to absorb oxygen. Meanwhile, when importance is given to the ability to absorb oxygen, it is preferred that the polyamide layer is at a position starting from the upper part of the support ring to near the injection gate. It is also preferred that the thickness of the polyamide layer is increased.

Furthermore, the ability to absorb oxygen varies depending on the capacity of the multilayer container. When multilayer containers have the same mass, a multilayer container having a capacity of 200 to 350 mL is more preferred, a multilayer container having a capacity of 200 to 330 mL is still more preferred, and a multilayer container having a capacity of 200 to 300 mL is further more preferred than a multilayer container having a capacity of 500 mL.

(Irradiation of Electron Beam)

It is preferable that the inside of the multilayer container of the present invention is irradiated with electron beam. For the multilayer container of the present invention, the inside of a preform described later may be irradiated with electron beam and then blow molding is performed. Alternatively, the inside of the multilayer container molded article after blow molding may be irradiated with electron beam. Of them, irradiating the inside of the multilayer container molded article after blow molding with electron beam is preferred.

Irradiation of electron beam has been done for the purpose of sterilization of containers. Unlike sterilization using y rays or X rays, sterilization with electron beam is advantageous in that the time of treatment is short. Since only the inside of a container is to be sterilized, in recent years only the inner surface of a container has been irradiated with electron beam to sterilize the inside of the container. Irradiating the inside of a container with electron beam enables sterilization at an accelerating voltage lower than that in the case where the outside of the container is irradiated with electron beam, and thus this is advantageous also in terms of energy saving.

In the multilayer container of the present invention, when the polyamide layer is at a position 5 to 35% from the inner surface of the multilayer container, electron beam can reach the polyamide layer even if the inside of the container is irradiated with electron beam.

Conditions of irradiation of electron beam will be described in detail later.

The multilayer container of the present invention is preferably a hollow container, more preferably a packaging container for liquid, which is used upon being filled with a liquid in the inside of a hollow container, and still more preferably a packaging container for beverage. Examples of the liquid to be filled in the inside may include various products, such as beverages, e.g., water, carbonated water, oxygen water, hydrogen water, milk, dairy products, juices, coffee, coffee beverages, carbonated soft drinks, teas, alcoholic beverages, etc.; liquid seasonings, e.g., sauce, soy sauce, syrup, sweet sake, dressing, etc.; chemicals, e.g., agrochemicals, insecticides, etc.; medical and pharmaceutical products; detergents; and the like. In particular, there are preferably exemplified beverages or carbonated beverages which are liable to be deteriorated in the presence of oxygen, for example, beers, wines, coffee, coffee beverages, fruit juices, carbonated soft drinks, carbonated water, or teas.

Furthermore, the multilayer container of the present invention has an excellent oxygen barrier property. When the multilayer container of the present invention has a capacity of 200 to 350 mL, the oxygen barrier property of the container (mL/bottle·day·0.21 atm) is preferably 0.015 or less, and more preferably 0.008 or less. When the multilayer container of the present invention has a capacity of more than 350 mL and 500 mL or less, the oxygen barrier property of the container (mL/bottle·day·0.21 atm) is preferably 0.020 or less, and more preferably 0.015 or less. The aforementioned oxygen barrier property is on a basis of the container fabricated in each of the Examples as mentioned later.

The oxygen barrier property of the container can be evaluated through an oxygen permeability test by the MOCON method in conformity with ASTM D3985. For the measurement, OX-TRAN2/61, manufactured by MOCON Inc. is used; water is filled in the respective bottles obtained in an amount of ⅓ of the capacity; nitrogen at 1 atm is made to flow into the inside of the bottle at a rate of 20 mL/min under a condition of an oxygen partial pressure of 0.21 atm at a temperature of 23° C. and at a bottle internal humidity of 100% RH, and an external humidity of 50% RH; and oxygen contained in the nitrogen after flowing in the inside of the bottle is detected by a coulometric sensor.

[Production Method of Multilayer Container]

A suitable method is selected as the method for producing the multilayer container of the present invention in consideration of, for example, the structure of molded articles. More specifically, the multilayer container can be produced by producing a preform by injecting a molten resin or resin composition into a mold from an injection molding machine and then stretch blowing the preform (injection blow molding, or injection stretch blow molding). Alternatively, the multilayer container can be produced by blowing a parison, which can be obtained by extruding a molten resin or resin composition into a mold from an extrusion molding machine, in the mold (direct blow molding).

It is preferred that the multilayer container of the present invention is produced by injection blow molding in which a preform is subjected to biaxial stretch blow molding.

More specifically, it is preferred that the method for producing the multilayer container of the present invention includes the following Step 1 and Step 2 in this order.

Step 1: a step for injection molding a multilayer preform comprising a polyester layer comprising a thermoplastic polyester resin (X) and a polyamide layer comprising a polyamide resin (Y), wherein the polyester layer is an innermost layer and the polyamide layer is an interlayer, and the polyamide resin (Y) comprises a polyamide resin (Y-1) comprising a structural unit derived from a diamine and a structural unit derived from a dicarboxylic acid, 70 mol % or more of the structural unit derived from a diamine being a structural unit derived from xylylenediamine; and 70 mol % or more of the structural unit derived from a dicarboxylic acid being a structural unit derived from an α, ω-linear aliphatic dicarboxylic acid having 4 to 20 carbon atoms;

Step 2: a step for biaxially stretch blow molding the multilayer preform obtained in the Step 1 by a process satisfying the following conditions (1) to (5):

(1) heating the surface of the multilayer preform at 80 to 120° C.; then (2) blowing high pressure air while changing the pressure in multiple stages with stretching the multilayer preform in a mold in a machine direction using a rod;

(3) a pressure in a first stage at the time of blowing high pressure air in multiple stages (primary blow pressure) of 0.3 to 2.0 MPa;

(4) a delay time in primary blow of 0.1 to 0.5 seconds;

(5) the stretching ratio in a transverse direction (TD) of 2.2 times or more, and the stretching ratio in a machine direction (MD) to the stretching ratio in the transverse direction (TD) (MD/TD) of 0.6 or more and less than 1.0.

The multilayer container of the present invention may be produced by cold parison molding or hot parison molding. The cold parison molding (2-stage molding) is a method of molding in which a preform after injection molding is cooled to room temperature and stored, and then the preform is heated again using a different apparatus and subjected to blow molding. Meanwhile, the hot parison molding (1-stage molding) is a method in which blow molding is carried out while preheating in injection molding and controlling temperature before blowing without completely cooling a parison to room temperature. In most cases of hot parison molding, a molding machine is equipped with, in the same unit, an injection molding machine, a temperature control zone and a blow molding machine to perform injection molding and blow molding of a preform.

In a preferred embodiment of the method for producing a multilayer container of the present invention, molding is performed by cold parison molding.

(Step 1)

The method for producing a multilayer container of the present invention comprises a step of injection molding of a multilayer preform.

The multilayer preform comprises a polyester layer comprising a thermoplastic polyester resin (X) and a polyamide layer comprising a polyamide resin (Y), wherein the polyester layer is an innermost layer and the polyamide layer is an interlayer, and the polyamide resin (Y) comprises a polyamide resin (Y-1)· comprising a structural unit derived from a diamine and a structural unit derived from a dicarboxylic acid, 70 mol % or more of the structural unit derived from a diamine being a structural unit derived from xylylenediamine; and 70 mol % or more of the structural unit derived from a dicarboxylic acid being a structural unit derived from an α, ω-linear aliphatic dicarboxylic acid having 4 to 20 carbon atoms. The polyester layer comprising a thermoplastic polyester resin (X), the polyamide layer comprising a polyamide resin (Y) and the structure of layers are as described above for the multilayer container.

It is preferred that when the polyester layer contains a component other than the thermoplastic polyester resin (X), the thermoplastic polyester resin (X) and other components may be previously mixed before molding of a preform to prepare a polyester resin mixture or a polyester resin composition. The mixing may be either drying blending or melt blending (melt kneading). That is, the thermoplastic polyester resin (X) and other components may be subjected to dry blending to prepare a polyester resin mixture; or the thermoplastic polyester resin (X) and other components may be subjected to melt blending to prepare a polyester resin composition. Above all, from the viewpoint of minimizing thermal history, the dry blending is preferred. Here, the dry blending means mechanical mixing in a particulate or pellet-like form. For mixing, a mixing device, such as a tumbler mixer, a ribbon mixer, a Henschel mixer, a Banbury mixer, etc., may be used. Alternatively, on the occasion of subjecting to molding processing, by supplying a predetermined amount of other components by a feeder (or a liquid addition device) different from a supply feeder of the thermoplastic polyester resin (X), a polyester resin mixture may be formed immediately before molding of a parison.

In the case of melt kneading the thermoplastic polyester resin (X) and other components, though the temperature in melt kneading is not particularly limited, from the viewpoint that the thermoplastic polyester resin (X) is thoroughly melted and thoroughly kneaded with other components, it is preferably 300 to 255° C., more preferably 290 to 260° C., and further preferably 285 to 265° C. In addition, though the time of melt kneading is not particularly limited, from the viewpoint that the thermoplastic polyester resin (X) and other components are uniformly mixed, it is preferably 10 to 600 seconds, more preferably 20 to 400 seconds, and further preferably 30 to 300 seconds. Though a device which is used for melt kneading is not particularly limited, examples thereof include an open type mixing roll, a non-open type Banbury mixer, a kneader, a continuous kneading machine (e.g., a uniaxial kneading machine, a biaxial kneading machine, a multiaxial kneading machine, etc.), and the like.

It is preferred that when the polyamide layer contains a component other than the polyamide resin (Y), the polyamide resin (Y) and other components may be previously mixed before molding of a preform to prepare a polyamide resin mixture or a polyamide resin composition. The mixing may be either drying blending or melt blending (melt kneading). That is, the polyamide resin (Y) and other components may be subjected to dry blending to prepare a polyamide resin mixture; or the polyamide resin (Y) and other components may be subjected to melt blending to prepare a polyamide resin composition. Above all, from the viewpoint of minimizing thermal history, the dry blending is preferred. For mixing, a mixer similar to that used for the polyester resin mixture described above is used. Alternatively, on the occasion of subjecting to molding processing, by supplying a predetermined amount of other components by a feeder (or a liquid addition device) different from a supply feeder of the polyamide resin (Y), a polyamide resin mixture may be formed immediately before molding of a parison.

In the case of melt kneading the polyamide resin (Y) and other components, though a temperature in melt kneading is not particularly limited, from the viewpoint that polyamide resin (Y) is thoroughly melted and thoroughly kneaded with other components, it is preferably 300 to 245° C., more preferably 290 to 250° C., and further preferably 280 to 255° C. In addition, though a time of melt kneading is not particularly limited, from the viewpoint that the polyamide resin (Y) and other components are uniformly mixed, it is preferably 10 to 600 seconds, more preferably 20 to 400 seconds, and further preferably 30 to 300 seconds. Though a device which is used for melt kneading is not particularly limited, examples thereof include an open type mixing roll, a non-open type Banbury mixer, a kneader, a continuous kneading machine (e.g., a uniaxial kneading machine, a biaxial kneading machine, a multiaxial kneading machine, etc.), and the like.

Next, the polyester resin (X) or the polyester resin composition is extruded from a first extruder, and the polyamide resin (Y) or the polyamide resin composition is extruded from a second extruder to form a parison (multilayer preform). More specifically, this step is preferably a step of molding a multilayer preform by means of extrusion molding, co-injection molding, compression molding, or the like.

In the extrusion molding, the polyester resin or the polyester resin composition and the polyamide resin or the polyamide resin composition are subjected to coextrusion molding to mold a multilayer preform.

In the co-injection molding, the polyester resin or the polyester resin composition and the polyamide resin or the polyamide resin composition are extruded into molds, respectively and then subjected to co-injection molding to mold a multilayer preform.

In the compression molding, there is exemplified a method in which the polyamide resin or the polyamide resin composition in the heat-melted state is intermittently extruded into an extrusion channel where the polyester resin or the polyester resin composition in the heat-melted state flows, and the polyester resin or the polyester resin composition surrounding the substantially whole of the extruded polyamide resin or polyamide resin composition is extruded from an extrusion port of the extrusion channel and properly supplied as a molten resin molding material into a molding mold, followed by compression molding to mold a multilayer preform.

Of them, co-injection molding is preferred from the viewpoint of productivity.

In the present invention, it is preferred that when the total thickness is taken as 100%, a multilayer preform is produced so that the polyamide layer is at a position 5 to 60% (preferably 5 to 35%) from the inner surface of a multilayer preform. It is also preferred that the multilayer preform is produced so that the thickness of the polyamide layer is 1 to 15% of the total thickness. More specifically, when the amount of injection from the above-described injection cylinder unit is adjusted, a multilayer container comprising a polyamide layer of a desired thickness at a desired position can be obtained.

A bottle in which the position of the barrier layer is changed in the thickness direction can be obtained with a valve stem mechanism which can adjust the amount of injection into a mold of the respective molten resins corresponding to the polyester inner layer, the polyamide layer and the polyester outer layer. Alternatively, the position of the polyamide layer may also be randomly adjusted in the thickness direction by adjusting the approach angle of channels of the respective layers at the junction of the polyester layer and the polyamide layer. The method for adjusting the position of the polyamide layer in the thickness direction is not limited to the above methods.

Irradiating the inside of a multilayer container molded article with electron beam enables sterilization at low accelerating voltage, and this is advantageous also in terms of energy saving.

The accelerating voltage of the electron beam for irradiation is preferably 1 keV or more, more preferably 5 keV or more, and further preferably 10 keV or more from the viewpoint of sterilization of the inner surface of the multilayer container, and allowing the electron beam to reach the polyamide layer to improve ability to absorb oxygen and delamination resistance. The accelerating voltage is preferably 200 keV or less, more preferably 150 keV or less and further preferably 130 keV or less from the viewpoint of energy saving.

The irradiation intensity of the electron beam (absorbed dose) is preferably 1 kGy or more, more preferably 5 kGy or more and further preferably 10 kGy or more from the viewpoint of sterilization of the inner surface of the multilayer container, and allowing the electron beam to reach the polyamide layer to improve ability to absorb oxygen and delamination resistance. The irradiation intensity is preferably 100 kGy or less, more preferably 75 kGy or less and further preferably 50 kGy or less from the viewpoint of energy saving.

The method and the apparatus for irradiating the inside of the multilayer container are not particularly limited, and reference is made to, for example, JP 2018-072076 A and JP 2013-129453 A.

The polyamide layer of the multilayer preform has a moisture content (Wp) of preferably 0.005 to 1% by mass. Herein, Wp is a value immediately before biaxial stretch blow molding of the following Step 2. The upper limit value of Wp is more preferably 0.7% by mass, further preferably 0.5% by mass and still more preferably 0.3% by mass. The moisture content in the above range is preferred because blow molding from a multilayer preform to a multilayer container is easy, and crystallization of the polyamide layer is suppressed in the process of blowing and thus delamination resistance becomes favorable. The moisture content in the above range is preferred also because the moisture content of the multilayer container is reduced. Furthermore, it is preferred because blushing of the polyamide layer due to absorption of moisture can be prevented.

Wp in the present description is a value of moisture content measured by using a moisture analyzer ("AQ-2000" manufactured by HIRANUMA Co. Ltd.) by the Karl Fischer method after carefully disassembling a multilayer preform to collect only the polyamide layer. The temperature of measurement is 235° C. and the time of measurement is 30 minutes.

It is preferred that in order to maintain Wp in the above range, the multilayer preform is stored in a bag made of film having a vapor transmission rate according to JIS K 7129 of preferably 20 $g/m^2$·day or less, more preferably 10 $g/m^2$·day or less, further preferably 5 $g/m^2$·day or less, and particularly preferably 2.5 $g/m^2$·day or less, until the multilayer preform is blow-molded into a multilayer bottle. The time of storage is not particularly limited as long as Wp is maintained in the above range, and in actual production of multilayer bottles, the preform is usually stored up to 365 days.

(Step 2)

The method for producing a multilayer container of the present invention comprises a step for biaxially stretch blow molding the multilayer preform obtained in the Step 1. The biaxial stretch blow molding is performed by a process satisfying the following conditions (1) to (5):

(1) heating the surface of the multilayer preform at 80 to 120° C.; then
(2) blowing high pressure air while changing the pressure in multiple stages with stretching the multilayer preform in a mold in a machine direction using a rod;
(3) a pressure in a first stage at the time of blowing high pressure air in multiple stages (primary blow pressure) of 0.3 to 2.0 MPa;
(4) a delay time in primary blow of 0.1 to 0.5 seconds;
(5) a stretching ratio in a transverse direction (TD) of 2.2 times or more, and a stretching ratio in a machine direction (MD) to the stretching ratio in the transverse direction (TD) (MD/TD) of 0.6 or more and less than 1.0.

Specifically, first the surface of the multilayer preform is heated at 80 to 120° C. (Condition (1)). The temperature of heating the surface of the multilayer preform is preferably 90 to 110° C., and more preferably 95 to 108° C. When the temperature of heating is in the above range, blow moldability is favorable. Furthermore, since the polyamide layer and the polyester layer are not cold stretched, blushing does not occur. The polyamide layer is not crystallized and thus blushing does not occur, and thus delamination resistance becomes also favorable. The surface temperature may be measured by using an infrared radiation thermometer at an emissivity of usually 0.95.

The preform is heated by, for example, an infrared heater. A plurality of heaters is usually used for heating, and the output balance of the heaters is also important. The output balance of the heaters, the temperature of heating a preform and the time of heating are suitably determined depending on the outside temperature and the temperature of the preform.

In the step of biaxial stretch blow molding, next the preform heated is biaxially stretch blow molded. More specifically, the preform heated is set in a mold and high pressure air is blown while changing the pressure in multiple stages (at least two stages) with stretching the multilayer preform in the mold in the machine direction using a rod (Condition (2)). When high pressure air is blown while changing the pressure in multiple stages, formability from a multilayer preform into a multilayer container becomes favorable and delamination resistance becomes favorable.

The pressure in the first stage in the multiple-stage blow (primary blow pressure) is 0.3 to 2.0 MPa (Condition (3)), preferably 0.4 to 1.8 MPa, and more preferably 0.5 to 1.5 MPa. In particular, when the multilayer container of the present invention has a capacity of 200 to 350 mL, the primary blow pressure is preferably 0.35 to 0.85 MPa, more preferably 0.4 to 0.7 MPa, and further preferably 0.4 to 0.65 MPa. When the pressure in the first stage is in the above range, formability from a multilayer preform into a multilayer container becomes favorable and delamination resistance becomes favorable.

The pressure in the final stage in the multiple-stage blow (secondary blow pressure) is preferably 2.0 to 4.0 MPa, more preferably 2.2 to 3.8 MPa, more preferably 2.4 to 3.6 MPa. When the pressure in the final stage is in the above range, formability from a multilayer preform into a multilayer container becomes favorable and delamination resistance becomes favorable.

The time from the start of stretching the multilayer preform using a rod to the start of the first-stage blow (the delay time in the primary blow) is 0.1 to 0.5 seconds (Condition (4)), preferably 0.12 to 0.45 seconds, and more preferably 0.15 to 0.40 seconds. In particular, when the multilayer container of the present invention has a capacity of 200 to 350 mL, the delay time in the primary blow is preferably 0.12 to 0.25 seconds, and more preferably 0.15 to 0.20 seconds. When the delay time in the primary blow is in the above range, formability from a multilayer preform into a multilayer container becomes favorable and delamination resistance becomes favorable.

For the stretching ratio in the biaxial stretch blow molding, the stretching ratio in the transverse direction (TD) is 2.2 times or more, and the stretching ratio in the machine direction (MD) to the stretching ratio in the transverse direction (TD) (MD/TD) is 0.6 or more and less than 1.0 (Condition (5)). By stretching in that range, a multilayer container having an excellent oxygen barrier property and excellent delamination resistance can be obtained.

The stretching ratio in the transverse direction (TD) is 2.2 times or more, preferably 3.0 times or more, and more preferably 3.3 times or more from the viewpoint of improving oxygen barrier property and delamination resistance. When the multilayer container of the present invention has a capacity of 200 to 350 mL, the stretching ratio in the transverse direction (TD) of the multilayer container of the present invention is preferably 2.3 times or more, more preferably 2.6 times or more, further preferably 2.8 times or more, and still further preferably 3.0 times or more.

The stretching ratio in the machine direction (MD) of the multilayer container of the present invention is preferably 1.5 to 4.0 times, more preferably 2.0 to 3.0 times, and further preferably 2.1 to 2.5 times from the viewpoint of improving oxygen barrier property and delamination resistance.

The stretching ratio in the machine direction (MD) to the stretching ratio in the transverse direction (TD) (MD/TD) is 0.6 or more and less than 1.0, preferably 0.65 or more and 0.95 or less, more preferably 0.68 or more and 0.90 or less, further preferably 0.68 or more and 0.80 or less, still more preferably 0.68 or more and 0.75 or less, and still further preferably 0.68 or more and 0.72 or less from the viewpoint of improving oxygen barrier property and delamination resistance.

EXAMPLES

The present invention is hereunder more specifically described by reference to the Examples and Comparative Examples, but it should be construed that the present invention is by no means limited to these Examples.

The thermoplastic polyester resin (X) and the polyamide resin (Y-1) used in the Examples and Comparative Examples are as follows.

<Thermoplastic Polyester Resin (X):

PET (Polyester resin): Polyethylene terephthalate (intrinsic viscosity: 0.83 dL/g), trade name: "BK 2180" manufactured by Mitsubishi Chemical Corporation (melting point 248° C.)

<Polyamide Resin (Y-1)>

MXD6 (Polyamide resin): Poly(metaxylylene adipamide) (relative viscosity: 2.7, melting point=240±5° C.), trade name "MX Nylon S6007" manufactured by Mitsubishi Gas Chemical Company

[Method of Measurement and Evaluation]

<Position and Thickness of Polyamide Layer>

The position and the thickness of the polyamide layer of the bottles prepared in Examples and Comparative Examples were measured as follows.

A sample of 1.5 cm×1.5 cm was cut from the bottle at a position 70 mm from the bottom of the bottle in 4 horizontal directions (0°, 90°, 180°, 270°) by a cutter. The total thickness was measured by using a micrometer ("Quick Micro MDQ" manufactured by Mitutoyo Corporation) and the ratio of the thickness of the respective layers was measured by using a film thickness meter based on optical interference ("DC-8200" manufactured by Gunze Limited), and the position and thickness of the polyamide layer was calculated from the total thickness and the ratio of the thickness of the respective layers obtained.

<Method of Identification of Layers>

The respective layers can be identified by the following IR measurement and 1H-NMR measurement.

(IR Measurement)

A sample of a 2 cm×2 cm square is cut from the respective layers and measured by IR by using the following apparatus.

Apparatus: Spectrum 100 manufactured by Perkin Elmer Japan ($^1$H-NMR)

A sample of the respective layers is collected and dissolved in a deuterated trifluoroacetic acid solvent at a concentration of 1 mg/mL to perform 1H-NMR.

Apparatus: AVANCE III-500, Ascend™ 500, manufactured by BRUKER

<Oxygen Barrier Property of Container>

The oxygen barrier property of the container was evaluated by the following method.

An oxygen permeability test by the MOCON method was conducted in conformity with ASTM D3985. For the measurement, OX-TRAN2/61, manufactured by MOCON Inc. was used. Water was filled in a bottle obtained in each of the Examples and Comparative Examples in an amount of ⅕ of the capacity; nitrogen at 1 atm was made to flow into the inside of the bottle at a rate of 20 mL/min under a condition of an oxygen partial pressure of 0.21 atm at a temperature of 23° C. and at a bottle internal humidity of 100% RH, and an external humidity of 50% RH; and oxygen contained in the nitrogen after flowing in the inside of the bottle was detected by a coulometric sensor.

The oxygen barrier property was evaluated based on the value of oxygen transmission 3 days after the start of measurement.

The criteria of evaluation for bottles having a capacity of 200 mL or more and 350 mL or less are as follows.

A: 0.008 mL/(bottle·day·0.21 atm) or less

B: more than 0.008 mL/(bottle·day·0.21 atm) and 0.015 mL/(bottle·day·0.21 atm) or less C: more than 0.015 mL/(bottle·day·0.21 atm)

The criteria of evaluation for bottles having a capacity of more than 350 mL and 500 mL or less are as follows.

A: 0.015 mL/(bottle·day·0.21 atm) or less

B: more than 0.015 mL/(bottle·day·0.21 atm) and 0.020 mL/(bottle·day. 0.21 atm) or less C: more than 0.020 mL/(bottle·day·0.21 atm)

<Delamination Resistance>

The multilayer bottles obtained were filled with carbonated water to their capacity and stored for a week in an environment of 23° C. and 50% RH. The body of the bottles, which contained carbonated water and was stored for a week, was repeatedly struck using a side impact tester (a device having 3 kg of a weight at the tip of a pendulum; the pendulum is swung from a position 90° to the bottle to strike the body of the bottle). Bottles in which the polyester layer was not delaminated from the polyamide layer were determined as "pass," and the delamination resistance was evaluated based on the number of tests until delamination of the polyester layer and the polyamide layer. Those for which the number of tests until delamination of the polyester layer and the polyamide layer was less than 28 times were rated as C, those for which the number of tests was less than 40 were rated as B, and those for which the number of tests was 40 times or more were rated as A. Bottles for which the number of tests until delamination is large have excellent delamination resistance.

<Rate of Improvement of Delamination Resistance>

For the delamination resistance measured as described above, the rate of change (rate of improvement) of the delamination resistance when the stretching ratio (MD/TD) was changed was calculated using, as a reference, the Comparative Examples of bottles of the respective capacities (in which the ratio of stretching ratios MD/TD is 1.04 to 1.07). Specifically, in the case of the bottles having a capacity of 500 mL, the rate of improvement was calculated by dividing "the number of tests until delamination" (described in the above <Delamination resistance>) measured using the bottles of Examples 1 to 3 by the number of tests measured in the same manner using the bottle of Comparative Example 1. In the case of the bottles having a capacity of 345 mL, the rate of improvement was calculated by dividing the number of tests measured using the bottles of Examples 4 and 5 by the number of tests measured using the bottle of Comparative Example 2, and the rate of improvement was calculated by dividing the number of tests measured using the bottles of Examples 6 and 7 by the number of tests measured using the bottle of Comparative Example 3. In the case of the bottles having a capacity of 200 mL, the rate of improvement was calculated by dividing the number of tests measured using the bottles of Examples 8 to 10 by the number of tests measured using the bottle of Comparative Example 4, and the rate of improvement was calculated by dividing the number of tests measured using the bottles of Examples 11 and 12 by the number of tests measured using the bottle of Comparative Example 5.

The above shows that a large value of the rate of improvement of delamination resistance means more effective stretching ratios for delamination resistance.

Examples 1 to 12 and Comparative Examples 1 to 5

<Production of Preform>

A preform having a three-layer structure of a polyester layer/a polyamide layer/a polyester layer was produced using an injection molding machine having a valve system mechanism capable of adjusting the amount of injection of the respective molten resins into a mold and a multilayer hot runner mold under the conditions described below.

Specifically, in Example 1, a preform having a three-layer structure of a polyester layer/a polyamide layer/a polyester layer was obtained by injecting the respective resins to fill the cavity with them while adjusting the amount of injection of the resins so that the thickness of the layers was: polyester layer (inner layer) 45%/polyamide layer (barrier layer) 10%/polyester layer (outer layer) 45% from the inner surface (the inside) when the total thickness was taken as 100%. The shape of the preform is as described in Table 1.

Furthermore, in Examples 2 to 12 and Comparative Examples 1 to 5, injection molding was performed while adjusting the amount of injection of the polyester resin and the polyamide resin so that the desired position of the start of the polyamide layer from the inner layer and the desired thickness of the polyamide layer were achieved.

Injection cylinder temperature on the skin side: 285° C.

Injection cylinder temperature on the core side: 265° C.

Resin channel temperature within the mold: 290° C.

Cooling water temperature of the mold: 15° C.

Cycle time: 33 seconds

Proportion of polyamide resin constituting interlayer of preform: 5% by mass

<Production of Multilayer Bottle>

A bottle was formed by using the preform prepared by the above method.

Specifically, the resulting preform was biaxially stretch blow molded by using a biaxial stretch blow molding apparatus (Model EFB1000ET manufactured by Frontier Inc.) to obtain petaloid-shaped bottles. The size and the capacity of the bottles are as described in Table 1 and the bottom has a petaloid shape. No dimple was formed in the body. The bottles having a capacity of 500 mL have an average thickness of the body of 0.35 mm; the bottles having a capacity of 345 mL have an average thickness of the body of 0.37 mm; and the bottles having a capacity of 200 mL have an average thickness of the body of 0.20 mm. The conditions of biaxial stretch blow molding are as described in Table 1 and in the following. The proportion of the polyamide layer based on the total mass of the resulting bottle is 5% by mass. The portion near the neck and the bottom of the resulting multilayer bottles are formed only of the polyester layer.

Secondary blow pressure: 2.5 MPa

Primary blow time: 0.30 sec

Secondary blow time: 2.0 sec

Blow air exhaustion time: 0.6 sec

Mold temperature: 30° C.

TABLE 1

| | | | Example 1 | Example 2 | Example 3 | Comparative Example 1 |
|---|---|---|---|---|---|---|
| Preform | Height under support ring | mm | 70.8 | 70.8 | 70.8 | 70.8 |
| | Circumferential diameter (Circle diameter) of body | mm | 16.3 | 19.1 | 21.7 | 23.2 |
| Bottle | Capacity | ml | 500 | 500 | 500 | 500 |
| | Height under support ring | mm | 201.8 | 201.8 | 201.8 | 201.8 |
| | Circumferential diameter (Circle diameter) of body | mm | 65.0 | 65.0 | 65.0 | 65.0 |
| Position of start of polyamide layer (Thickness from inner surface) | | % | 45 | 45 | 45 | 45 |
| Stretching ratio based on circle diameter (MD, machine direction) | | Times | 2.9 | 2.9 | 2.9 | 2.9 |
| Stretching ratio based on circle diameter (TD, circumferential direction) | | Times | 4.0 | 3.4 | 3.0 | 2.8 |
| MD/TD ratio based on circle diameter | | | 0.73 | 0.85 | 0.97 | 1.04 |
| Moisture content of polyamide layer | | wt % | 0.20 | 0.20 | 0.20 | 0.20 |
| Primary blow pressure | | MPa | 0.9 | 0.9 | 0.9 | 0.9 |
| Delay time in primary blow | | Seconds | 0.30 | 0.30 | 0.30 | 0.30 |
| Surface temperature of preform | | °C | 103 | 103 | 103 | 103 |
| Delamination resistance | | Evaluation | A | A | A | B |
| | | Times[1)] | 71 | 59 | 44 | 33 |
| Rate of improvement of delamination resistance[2)] | | | 2.15 | 1.79 | 1.33 | — |
| Oxygen barrier property | | Evaluation | A | A | B | C |

[1)]Number of impact tests until delamination occurs

[2)]Value calculated by dividing the number of impact tests until delamination in Examples 1 to 3 by that in Comparative Example 1

TABLE 1-continued

| | | | Example 4 | Example 5 | Comparative Example 2 | Example 6 | Example 7 | Comparative Example 3 |
|---|---|---|---|---|---|---|---|---|
| Preform | Height under support ring | mm | 67.5 | 67.5 | 67.5 | 67.5 | 67.5 | 67.5 |
| | Circumferential diameter (Circle diameter) of body | mm | 13.8 | 16.9 | 18.6 | 13.8 | 16.9 | 18.6 |
| Bottle | Capacity | ml | 345 | 345 | 345 | 345 | 345 | 345 |
| | Height under support ring | mm | 208.0 | 208.0 | 208.0 | 208.0 | 208.0 | 208.0 |
| | Circumferential diameter (Circle diameter) of body | mm | 54.0 | 54.0 | 54.0 | 54.0 | 54.0 | 54.0 |
| Position of start of polyamide layer (Thickness from inner surface) | | % | 45 | 45 | 45 | 15 | 15 | 15 |
| Stretching ratio based on circle diameter (MD, machine direction) | | Times | 3.1 | 3.1 | 3.1 | 3.1 | 3.1 | 3.1 |
| Stretching ratio based on circle diameter (TD, circumferential direction) | | Times | 3.9 | 3.2 | 2.9 | 3.9 | 3.2 | 2.9 |
| MD/TD ratio based on circle diameter | | | 0.79 | 0.97 | 1.07 | 0.79 | 0.97 | 1.07 |
| Moisture content of polyamide layer | | wt % | 0.20 | 0.20 | 0.20 | 0.20 | 0.20 | 0.20 |
| Primary blow pressure | | MPa | 0.7 | 0.7 | 0.7 | 0.7 | 0.7 | 0.7 |
| Delay time in primary blow | | Seconds | 0.22 | 0.22 | 0.22 | 0.22 | 0.22 | 0.22 |
| Surface temperature of preform | | °C | 105 | 105 | 105 | 105 | 105 | 105 |
| Delamination resistance | | Evaluation | A | B | C | A | A | B |
| | | Times[1)] | 45 | 28 | 20 | 66 | 42 | 28 |
| Rate of improvement of delamination resistance[2)] | | | 2.25 | 1.40 | — | 2.36 | 1.50 | — |
| Oxygen barrier property | | Evaluation | A | B | C | A | B | C |

[1)]Number of impact tests until delamination occurs
[2)]Value calculated by dividing the number of impact tests until delamination in Examples 4 and 5 by that in Comparative Example 2
Value calculated by dividing the number of impact tests until delamination in Examples 6 and 7 by that in Comparative Example 3

| | | | Example 8 | Example 9 | Example 10 | Comparative Example 4 | Example 11 | Example 12 | Comparative Example 5 |
|---|---|---|---|---|---|---|---|---|---|
| Preform | Height under support ring | mm | 61.9 | 61.9 | 61.9 | 61.9 | 61.9 | 61.9 | 61.9 |
| | Circumferential diameter (Circle diameter) of body | mm | 14.5 | 16.0 | 20.0 | 21.8 | 16.0 | 20.0 | 21.8 |
| Bottle | Capacity | ml | 200 | 200 | 200 | 200 | 200 | 200 | 200 |
| | Height under support ring | mm | 145.0 | 145.0 | 145.0 | 145.0 | 145.0 | 145.0 | 145.0 |
| | Circumferential diameter (Circle diameter) of body | mm | 48.0 | 48.0 | 48.0 | 48.0 | 48.0 | 48.0 | 48.0 |
| Position of start of polyamide layer (Thickness from inner surface) | | % | 45 | 45 | 45 | 45 | 15 | 15 | 15 |
| Stretching ratio based on circle diameter (MD, machine direction) | | Times | 2.3 | 2.3 | 2.3 | 2.3 | 2.3 | 2.3 | 2.3 |
| Stretching ratio based on circle diameter (TD, circumferential direction) | | Times | 3.3 | 3.0 | 2.4 | 2.2 | 3.0 | 2.4 | 2.2 |
| MD/TD ratio based on circle diameter | | | 0.70 | 0.77 | 0.96 | 1.05 | 0.77 | 0.96 | 1.05 |
| Moisture content of polyamide layer | | wt % | 0.20 | 0.20 | 0.20 | 0.20 | 0.20 | 0.20 | 0.20 |
| Primary blow pressure | | MPa | 0.6 | 0.6 | 0.6 | 0.6 | 0.6 | 0.6 | 0.6 |
| Delay time in primary blow | | Seconds | 0.18 | 0.18 | 0.18 | 0.18 | 0.18 | 0.18 | 0.18 |
| Surface temperature of preform | | °C | 106 | 106 | 106 | 106 | 106 | 106 | 106 |
| Delamination resistance | | Evaluation | A | B | B | C | A | A | C |
| | | Times[1)] | 47 | 36 | 28 | 16 | 63 | 47 | 25 |
| Rate of improvement of delamination resistance[2)] | | | 2.94 | 2.25 | 1.75 | — | 2.52 | 1.88 | — |
| Oxygen barrier property | | Evaluation | A | A | B | C | A | B | C |

[1)]Number of impact tests until delamination occurs
[2)]Value calculated by dividing the number of impact tests until delamination in Examples 8 to 10 by that in Comparative Example 4
Value calculated by dividing the number of impact tests until delamination in Examples 11 and 12 by that in Comparative Example 5

As is clear from the results of Table 1, the present invention can provide a multilayer container having an improved oxygen barrier property and excellent delamination resistance and a method for producing the same.

The present invention can provide a multilayer container having an improved oxygen barrier property and excellent delamination resistance.

The multilayer container of the present invention can be suitably used as a container for storing a drink easily degraded in the presence of oxygen, or a carbonated drink, such as beer, wine, coffee, coffee drink, fruit juice, carbonated soft drink, carbonated water and tea.

The invention claimed is:

1. A multilayer container comprising a polyester layer comprising a thermoplastic polyester resin (X) and a polyamide layer comprising a polyamide resin (Y),
   wherein the polyester layer is an innermost layer and the polyamide layer is an interlayer,
   and the polyamide resin (Y) comprises a polyamide resin (Y-1) comprising a structural unit derived from a diamine and a structural unit derived from a dicarboxylic acid, 70 mol % or more of the structural unit derived from a diamine being a structural unit derived from xylylenediamine; and 70 mol % or more of the structural unit derived from a dicarboxylic acid being a structural unit derived from an α, ω-linear aliphatic dicarboxylic acid having 4 to 20 carbon atoms, and wherein a stretching ratio in a transverse direction (TD) is 2.2 times or more, and a stretching ratio in a machine direction (MD) to the stretching ratio in the transverse direction (TD) (MD/TD) is 0.6 or more and less than 1.0, and wherein the multilayer container has a capacity of 200 to 350 mL, wherein the multilayer container has a three-layer structure of a polyester layer as an innermost layer and an outermost layer and a polyamide layer as an interlayer, and wherein, when the total thickness of the multilayer container is taken as 100%, the polyamide layer is at a position 5.5 to 20% from the inner surface of the multilayer container.

2. The multilayer container according to claim 1, wherein the multilayer container has a total thickness of 50 to 500 μm.

3. The multilayer container according to claim 1, wherein the thermoplastic polyester resin (X) comprises a thermoplastic polyester resin (X-1) comprising a structural unit derived from a dicarboxylic acid and a structural unit derived from a diol, 50 mol % or more of the structural unit derived from a dicarboxylic acid being a structural unit derived from terephthalic acid; and 50 mol % or more of the structural unit derived from a diol being a structural unit derived from ethylene glycol.

4. The multilayer container according to claim 3, wherein the thermoplastic polyester resin (X-1) comprises a structural unit derived from a dicarboxylic acid and a structural unit derived from a diol, 90 mol % or more of the structural unit derived from a dicarboxylic acid being a structural unit derived from terephthalic acid; and 90 mol % or more of the structural unit derived from a diol being a structural unit derived from ethylene glycol.

5. The multilayer container according to claim 1, wherein the polyamide resin (Y-1) comprises a structural unit derived from a diamine and a structural unit derived from a dicarboxylic acid, 80 mol % or more of the structural unit derived from a diamine being a structural unit derived from xylylenediamine; and 80 mol % or more of the structural unit derived from a dicarboxylic acid being a structural unit derived from adipic acid.

6. The multilayer container according to claim 1, wherein an intrinsic viscosity of the thermoplastic polyester resin (X) is 0.5 to 2.0 dL/g.

7. The multilayer container according to claim 1, wherein the stretching ratio in a transverse direction (TD) is from 2.3 to 3.9 times.

8. The multilayer container according to claim 1, wherein the stretching ratio in the machine direction (MD) to the stretching ratio in the transverse direction (TD) (MD/TD) is 0.6 or more and less than 0.90.

9. The multilayer container according to claim 1, wherein the stretching ratio in a transverse direction (TD) is from 2.3 to 3.9 times, and the stretching ratio in the machine direction (MD) to the stretching ratio in the transverse direction (TD) (MD/TD) is 0.6 or more and less than 0.90.

10. The multilayer container according to claim 9, wherein, when the total thickness of the multilayer container is taken as 100%, the polyamide layer is at a position 12 to 20% from the inner surface of the multilayer container.

11. The multilayer container according to claim 10, wherein, when the total thickness of the multilayer container is taken as 100%, the thickness of the polyamide layer of the multilayer container of the present invention is from 1% to 15%.

12. The multilayer container according to claim 10, wherein the multilayer container has a capacity of 200 to 330 mL.

13. The multilayer container according to claim 9, wherein the multilayer container has a capacity of 200 to 330 mL.

14. The multilayer container according to claim 1, wherein the stretching ratio in a transverse direction (TD) is from 2.6 to 3.9 times, wherein the stretching ratio in the machine direction (MD) to the stretching ratio in the transverse direction (TD) (MD/TD) is 0.6 or more and less than 0.80, wherein, when the total thickness of the multilayer container is taken as 100%, the polyamide layer is at a position 5.5 to 20% from the inner surface of the multilayer container, and wherein the multilayer container has a capacity of 200 to 330 mL.

15. The multilayer container according to claim 1, wherein an oxygen barrier property of the container (mL/bottle·day·0.21 atm) is 0.015 or less.

16. The multilayer container according to claim 1, wherein, when the total thickness of the multilayer container is taken as 100%, the polyamide layer is at a position 12 to 20% from the inner surface of the multilayer container.

17. The multilayer container according to claim 1, wherein, when the total thickness of the multilayer container is taken as 100%, the thickness of the polyamide layer of the multilayer container is from 1% to 15%.

* * * * *